United States Patent [19]
Ito

[11] Patent Number: 5,300,723
[45] Date of Patent: Apr. 5, 1994

[54] ELECTRONIC MUSICAL INSTRUMENT

[75] Inventor: Mikio Ito, Hamamatsu, Japan

[73] Assignee: Yamaha Corporation, Hamamatsu, Japan

[21] Appl. No.: 811,025

[22] Filed: Dec. 20, 1991

[30] Foreign Application Priority Data

| Dec. 28, 1990 | [JP] | Japan | 2-416357 |
| Jan. 9, 1991 | [JP] | Japan | 3-012741 |
| Jan. 9, 1991 | [JP] | Japan | 3-012742 |

[51] Int. Cl.$^5$ .............. G09B 15/04; G10H 1/18; G10H 1/36
[52] U.S. Cl. .............. 84/601; 84/609; 84/615; 84/477 R
[58] Field of Search .............. 84/601, 602, 615, 622, 84/634, 647, 659, 609, 477 R, 478

[56] References Cited

U.S. PATENT DOCUMENTS

| 4,250,788 | 2/1981 | Franz et al. | 84/602 X |
| 4,422,361 | 12/1983 | Ishii . | |
| 4,441,399 | 4/1984 | Wiggins . | |
| 4,690,025 | 9/1987 | Hines . | |
| 5,125,314 | 6/1992 | Chihana | 84/622 |
| 5,144,875 | 9/1992 | Nakada . | |

FOREIGN PATENT DOCUMENTS

| 130222 | 9/1898 | Japan . |
| 74275 | 5/1983 | Japan . |
| 109770 | 7/1983 | Japan . |
| 109771 | 7/1983 | Japan . |
| 109772 | 7/1983 | Japan . |
| 109773 | 7/1983 | Japan . |
| 109774 | 7/1983 | Japan . |
| 109775 | 7/1983 | Japan . |
| 109776 | 7/1983 | Japan . |
| 109777 | 7/1983 | Japan . |
| 59-97172 | 6/1984 | Japan . |

Primary Examiner—Stanley J. Witkowski
Attorney, Agent, or Firm—Graham & James

[57] ABSTRACT

An electronic musical instrument, which carries out a plurality of process functions, comprises a plurality of operation elements, function designation device, setting device, reading device, assigning device, and control device. The plurality of operation elements is operated. The function designation device stores function designation data which designates a plurality of functions corresponding to one of a plurality of process functions. The setting device freely connects or disconnects the function designation device with the electronic musical instrument. The reading device reads out the function designation data stored in the function designation device. The assigning device respectively assigns the plurality of functions, designated based on the function designation data, to plurality of operation elements. The control device carries out the functions respectively assigned to the plurality of operation elements when the plurality of operation elements are respectively operated. Therefore, the electronic musical instrument carries out a plurality of process functions by changing the function designation device to be connected therewith.

10 Claims, 28 Drawing Sheets

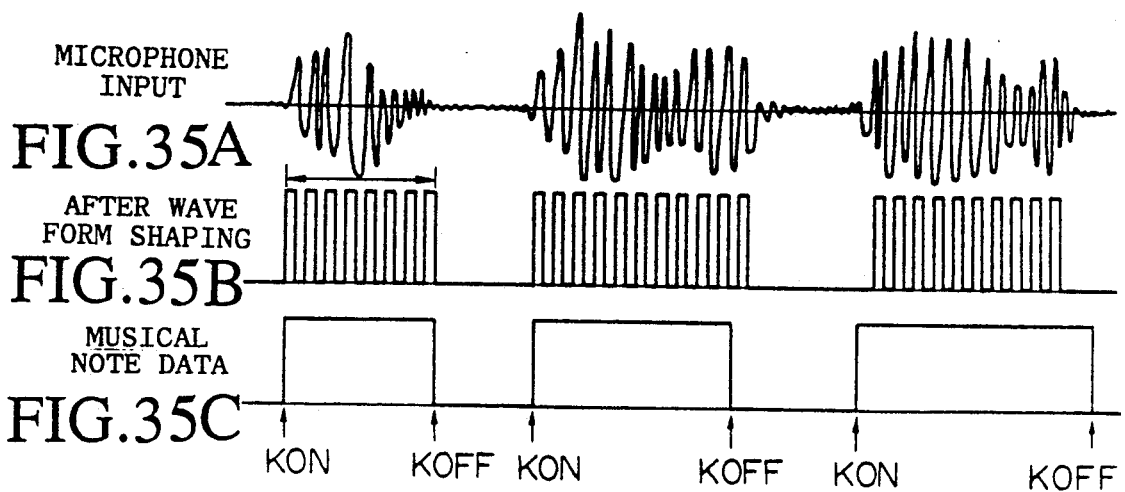
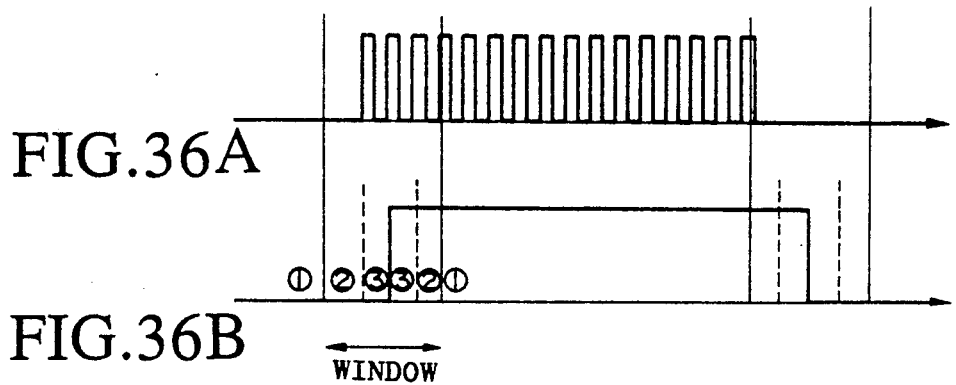

ELECTRONIC MUSICAL INSTRUMENT

FIELD OF THE INVENTION

The present invention relates to an electronic musical instrument having a plurality of operation switches and performing processes, each corresponding to these operation switches, and more especially relates to an electronic musical instrument generating various sounds according to the aforementioned operation switches and further to a training apparatus for studying and relating the sound generated by automatic performance and the like and the visual information related thereto.

PRIOR ART

In general, electronic machinery has a plurality of functions. It has a plurality of operation switches for selecting a certain function from among these functions and for inputting data. To the operation switches at least function is assigned.

Here, an electronic musical instrument serves as an example for explanation. An electronic musical instrument, besides a keyboard for a performance, also provides tone color selection, style selection of accompaniment (waltz, bossa nova and other rhythm patterns) and operation switches for selecting the song in a memory section storing the performance on the operation panel. Furthermore, for assigning a plurality of functions to one operation switch, function selection operation switches (mode switches) are also provided.

When providing a multi-operation switch panel on the aforementioned electronic musical instrument, aforementioned panel gets complicated, misoperation occurs easily and there arises the problem of high costs due to the complicated structure. When an operation switch has a plurality of modes and to each mode a plurality of functions is assigned to, it becomes difficult to distinguish which function of what mode the operation switch has, and therefore the problem of easy operation arises.

In the aforementioned electronic musical instruments, musical training apparatuses are known which compare a randomly created rhythm with a rhythm selected and drawn up in an outer part, and educate the rhythmical sense of the player according to the agreement and disagreement thereof. This kind of technique is disclosed in the Japanese application Heil-30222.

Though in the aforementioned training apparatuses it was possible only to do auditive comparisons with such things as rhythms, the problem arose that it was not possible, for example, to relate a melody with its name, with its form, a rhythm style with its name, a melody and its musical notes, a composer, a performed melody and visual information relating to the melodies.

Furthermore, in the aforementioned musical instruments, as one of the functions there is the karaoke marking function using automatic accompaniment functions. In these kind of electronic musical instruments, automatic accompaniment is compared with the singers voice input via such things like a microphone, and marking is carried out according to the amount of discrepancy in relation to the automatic performance. This kind of technique is disclosed in Japanese laid open number SHO 59-97172.

A problem in karaoke marking functions in aforementioned musical instruments was that during the whole performance time when one note was continually produced, for comparing the data during this time with each other the processing time became very long.

SUMMARY OF THE INVENTION

Consequently, it is an object of the present invention to offer an electronic musical instrument which takes into account aforementioned points of problems, does not have a too complicated panel, where functions may easily be chosen, operations are easy, and there is no turn-up of cost ups.

Accordingly, the present invention provides an electronic musical instrument which carries out a plurality of process functions, comprising:

a plurality of operation elements to be operated;

function designation means for storing function designation data which designates a plurality of functions corresponding to one of a plurality of process functions;

setting means for freely connecting or disconnecting the function designation means with the electronic musical instrument;

reading means for reading out the function designation data stored in the function designation means;

assigning means for respectively assigning the plurality of functions, designated based on the function designation data, to plurality of operation elements; and control means for carrying out the functions respectively assigned to the plurality of operation elements when the plurality of operation elements are respectively operated, wherein the electronic musical instrument carries out a plurality of process functions by changing the function designation means to be connected therewith.

It is further an object of the present invention to provide a music training apparatus for making it possible to study effectively the automatically performed sounds, music and the visual information related therewith in order to resolve the problems described above.

Accordingly, the present invention provides an electronic musical instrument which carries out a plurality of process functions, comprising:

a plurality of operation elements to be operated;

function designation means for storing function designation data which designates a plurality of functions corresponding to one of a plurality of process functions;

setting means for freely connecting or disconnecting the function designation means with the electronic musical instrument;

reading means for reading out the function designation data stored in the function designation means;

assigning means for respectively assigning the plurality of functions, designated based on the function designation data, to plurality of operation elements; and control means for carrying out the functions respectively assigned to the plurality of operation elements when the plurality of operation elements are respectively operated, wherein the electronic musical instrument carries out a plurality of process functions by changing the function designation means to be connected therewith.

In order to resolve the problems described above it is another object of the present invention to provide an electronic musical instrument for making it possible to decrease the process time necessary for comparing the data of the automatic performance with the inputted voice data in the karaoke marking function based on the electronic musical instrument.

Accordingly, the present invention provides an electronic musical instrument comprising performance data memory means for storing automatic performance data;

reading means for successively reading out said automatic performance data according to a predetermined timing;

timing generation means for generating one or both of sound and silence timings of an outer signal inputted from outer parts according to sound or silence timing of said read out automatic performance data;

window generating means for setting the window of a predetermined time interval before or after both or one of sound and silence timing of said automatic performance data;

comparing means for comparing the degree of discrepancy between one or both of sound and silence timing of said automatic performance data and one or both of sound and silence timing of said outer signals within said window; and marking means for marking according to the comparison result of said comparison means.

BRIEF EXPLANATION OF THE FIGURES

FIG. 35A is a diagram of the input wave form of the microphone MC, FIG. 35B is a diagram of the output wave form of the wave form shaping circuit, FIG. 35C is a diagram of the wave form of the musical note data.

FIGS. 36A, B are wave diagrams for explaining the windows and the comparison process making use thereof in the main preferred embodiment; FIG. 36A shows the output wave form of the wave form shaping circuit and FIG. 36B shows the wave form of the musical note data.

DETAILED EXPLANATION OF THE INVENTION

First preferred embodiment

Figure 1:
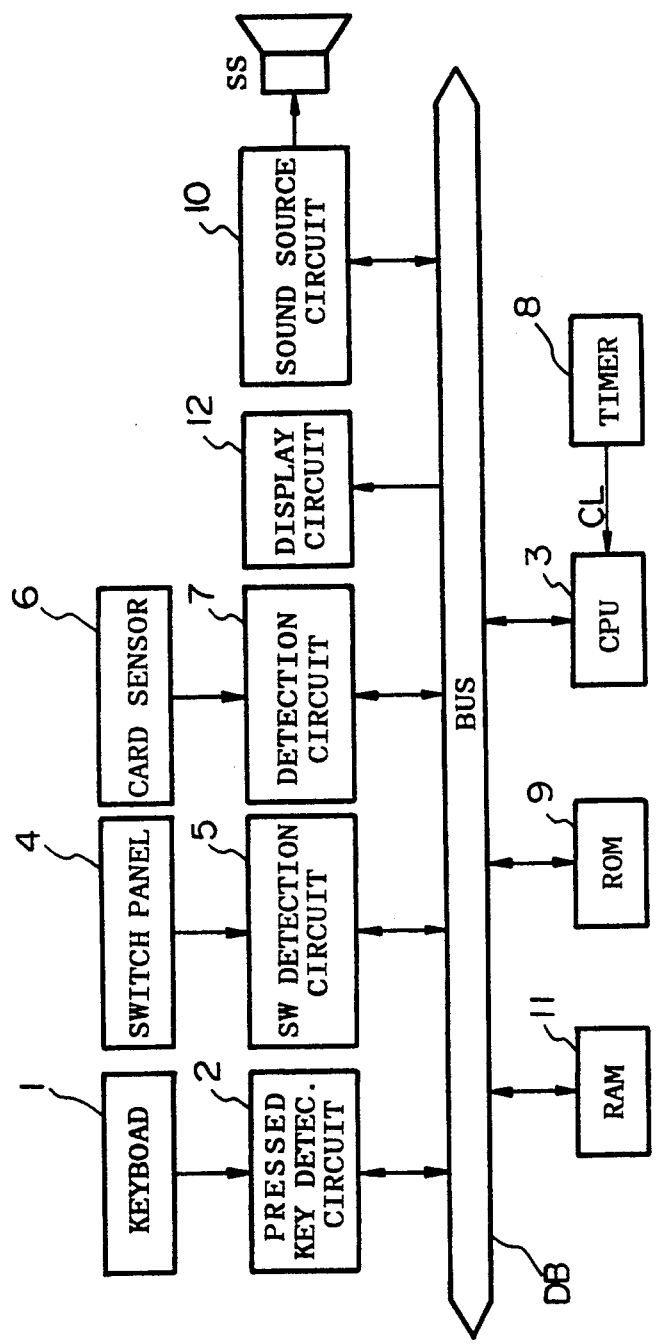
FIG. 1 is a block diagram showing the construction of the first preferred embodiment of the present invention.

FIG. 1 is a block diagram showing the construction of the electronic musical instrument of the first preferred embodiment of the present invention. In this figure there is a keyboard 1 where a plurality of white and black keys are provided. Also provided are switches for detecting the pressing and releasing of a key, and a detecting machine for detecting the speed of this. The states of these keys are detected by pressed key detection circuit 2. Pressed key detection circuit 2 supplies performance information data such as key-on signals of a pressed key, key code and key velocity via a data bus DB to CPU 3.

Next, switch panel 4 consists of a plurality of operation switches for operating such things as tone color selection, selection of accompaniment style, and selection of memory partition for storing the performance (song selection). SW detection circuit 5 is a circuit detecting whether or not an aforementioned operation switch has been pressed, and supplies via data-bus DB the information of the operation switch which is being pressed to CPU 3.

Furthermore, there is a card sensor 6 for detecting that a card (explained in detail hereafter) for providing functions of operation switches has been input into the card slot part provided at the operation panel of the electronic musical instrument's main body. When the card is input, a fixed input state signal is output to detection circuit 7. Detection circuit 7 supplies via data bus DB the data expressing the kind of card to CPU 3 when an input state signal is detected.

Timer 8 generates a fixed standard clock CL and supplies it to CPU 3.

Aforementioned CPU 3 controls the whole electronic musical equipment, provides the operation switch functions based on the card data in accordance with the program stored in ROM 9, generates musical tone data based on such things as aforementioned performance information, operation switch information and card data, and supplies this to sound source circuit 10. Furthermore, the operation results occurring in the aforementioned process are stored in RAM 11.

Sound source circuit 10 tonalizes aforementioned tone data by speaker SP after having changed them to analog signals. Then, display circuit 12 displays the working conditions of the concerned equipment.

Figure 2:
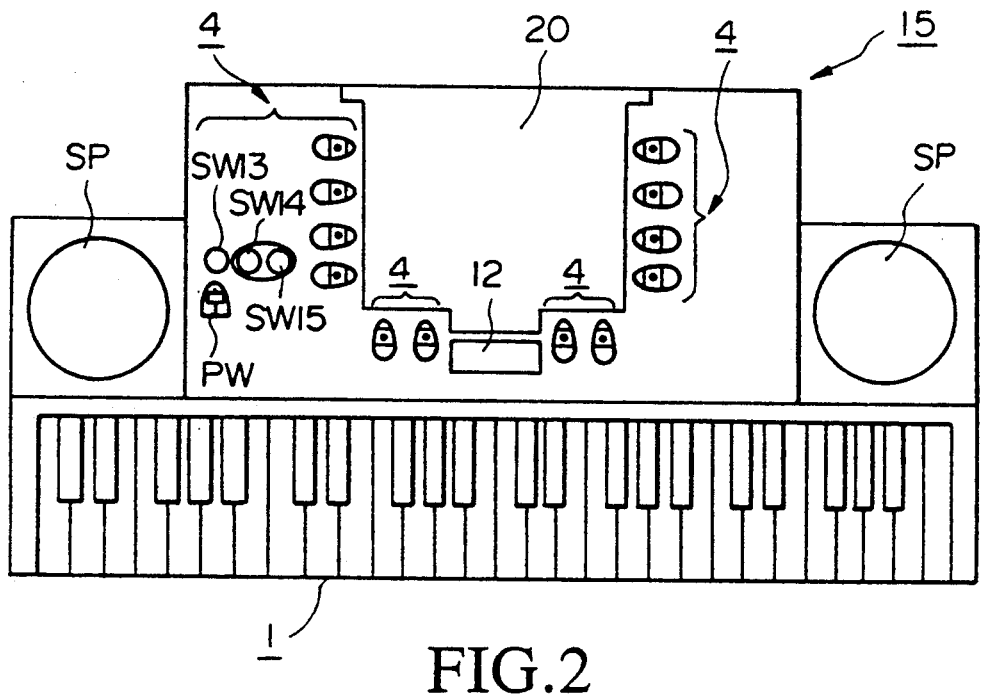
FIG. 2 is a front view showing the appearance of the electronic musical instrument of the main preferred embodiment.

With regard to the position of all the aforementioned parts an explanation is given on the external appearance of the whole body of the electronic musical equipment shown in FIG. 2. Parts corresponding to FIG. 1 bear identical labels and explanation is omitted. In the figure, operation panel 15 is provided in the back part center of the main body, and in the middle part of aforementioned operation panel 15, aforementioned card slot part 20 is provided.

Card slot part 20 maintains only the edge part of the card and for making it possible to see the surface of this card a window is provided. In the neighbourhood of card slot part 20 a plurality of panel switches 4 are provided. By these panel switches 4, power switch PW, function selection switches SW 1-SW 12 (referring to FIG. 3), demo switch SW13, and volume switches SW14 and SW15 are formed. Function selection switches SW1-SW12 are arranged in the surrounding of the aforementioned window of card slot part 20. Next, power switch PW, demo switch SW13, volume switches SW14 and SW15 are arranged in a fixed position. Power switch PW is the switch used for power input, and demo SW13 is the switch used for demo performances. Volume switch SW14 is for lowering the volume, whereas switch SW15 is for increasing the volume.

Figure 4:
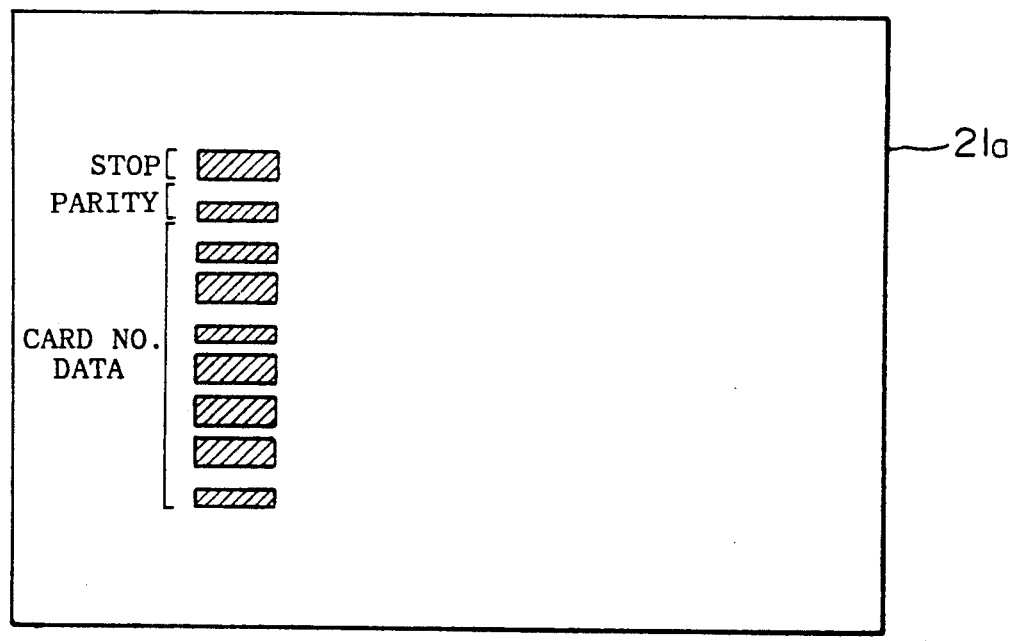
FIG. 4 is a front view showing the back side of the card of the same preferred embodiment.
Figure 3:
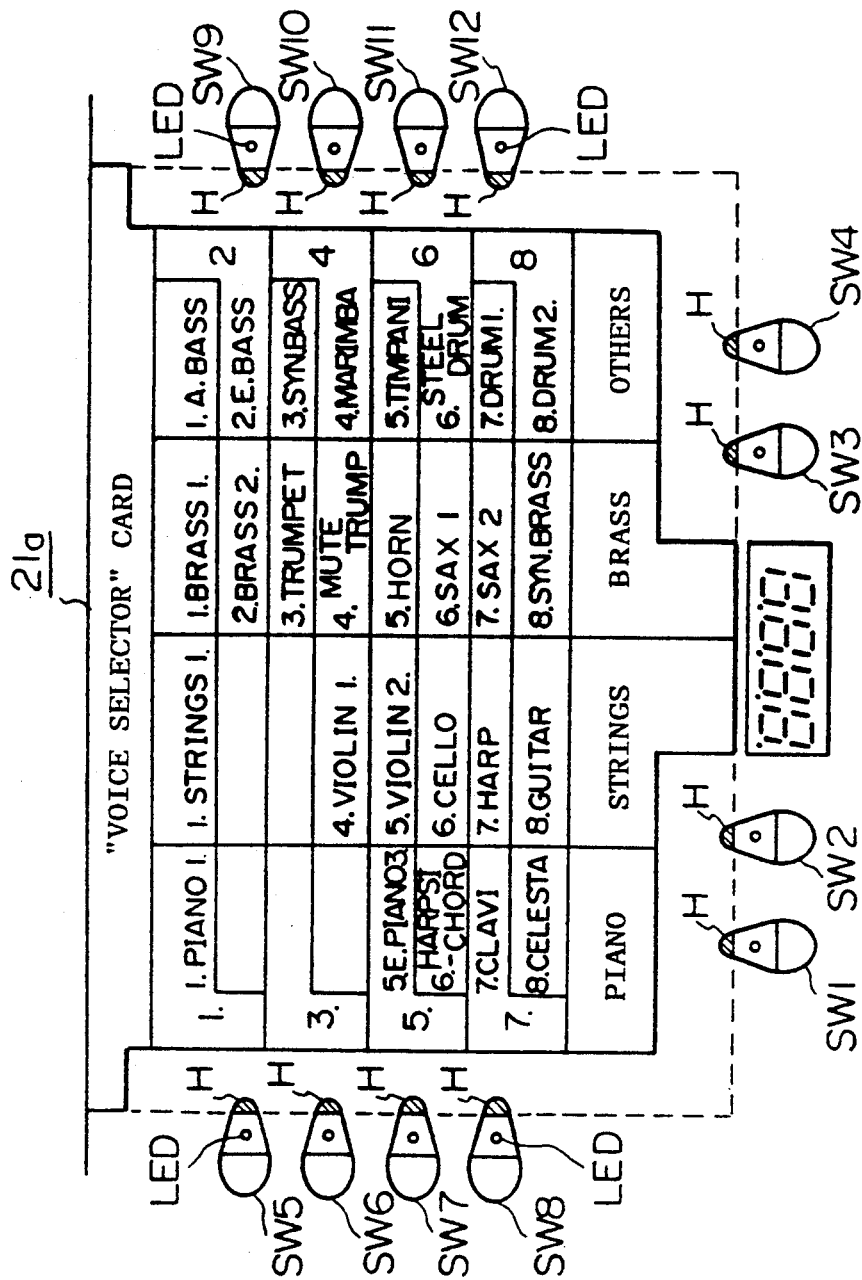
FIG. 3 is a front view showing the relation between the card slot part of the electronic musical instrument and the voice selector card input into said card slot in the same preferred embodiment.

Next, an explanation is given on the aforementioned card slot part 20 and the function selection switches SW1-SW12 provided in the surrounding thereof, and also an explanation on the card by referring to FIGS. 3 and 4. First, FIG. 3 is a front view showing the card slot part 20 of operation panel 15 and the positioning of function selection switches SW1-SW12 provided in the vicinity thereof.

In this figure, a card 21a is input in card slot part 20. This card 21a, for this example, is a "voice select" card and makes it possible to select a tone color (instrument) of the sound by means of aforementioned function selection switches SW1-SW12. On the surface of card 21a the musical instruments which can be selected by aforementioned card 21a are partitioned into groups according to function selection switches SW1-SW12 and are arranged in fixed positions. Furthermore, function selection switches SW1-SW12 are provided with light emitting LEDs which are illuminated when they are in On-position. These function selection switches SW1-SW12 are provided so that they just follow the outer form of card 21a (referring to dotted line of FIG. 3), and in the neighbourhood of the switches, also on the operation panel touching the rim part of card 21a, half round holes H are provided. In other words, the player can see the edge surface of card 21a through these holes H.

In this preferred embodiment, for example, a musical instrument of a piano system is positioned in the first row according to function selection switch SW1, musical instrument of string systems are arranged in the second row according to function selection switch SW2. Hereinafter, similarly brass instruments are arranged in the third row according to function selection switch SW3 and other instruments are arranged in row 4 according to function selection switch SW4. Furthermore, the letters displaying the instrument's name are printed in the same color for each column, and for making it easy to differentiate the correspondence relation of each column with the function selection switches SW1-SW4, the edge part of card 21a which can be seen from the holes H provided near the function selection switches SW1-SW4 are colored with the same color as the letters in the aforementioned column.

Every musical instrument of every system is combined with a musical instrument of another system and forms one group; each group is to correspond to function selection switches SW5-SW8 and SW9-SW12 provided on both sides of card slot part 20. For example, on function selection switch SW5 the PIANO of the first row, STRINGS, BRASS 1 and A. BRASS are arranged to one group. Furthermore, on function selection switch SW6 the elements from the third row like TRUMPET and SYN. BASS are arranged to one group. Hereinafter, similarly musical instruments from the 5th row correspond to function selection switch SW7 and musical instruments from row 7 correspond to function selection switch SW8.

On the other hand, musical instruments of the second row correspond to function selection switch SW9, musical instruments of the 4th row correspond to function selection switch SW10. Musical instruments of the 6th row correspond to function selection switch SW11 and musical instruments of the 8th row correspond to function selection switch SW12. The background color of the musical instrument's name is printed in the same color for each row, and for making it easy to distinguish corresponding relations between musical instruments of each row and function selection switches SW5-SW12, the same color as the back ground color of each row is attached to the edge part of card 21a which can be seen from holes H provided near the function selection switches SW5-SW12.

The characteristic of this present invention is to arrange each function (for this example suiting for the selection of each musical instrument) as illustrated, and furthermore makes it easy to differentiate between the function selection switches SW1-SW12 by a color partition for each function.

On the back side of card 21a, as shown in FIG. 4, the bar code showing the card number is printed in a fixed position and reads from the top: stop bit, parity bit and card number data. These card number data are formed by 7 bit. Exclusion of 0 yields the values of 1 to 127, and by these 127 kinds of cards can be distinguished. Furthermore, for the case of this example, at the aforementioned card slot part 20 a bar code reading device is provided.

Next, for explaining the action of the aforementioned preferred embodiment an explanation is given by referring to the flow charts shown in FIGS. 5 through 9.

Figure 5:
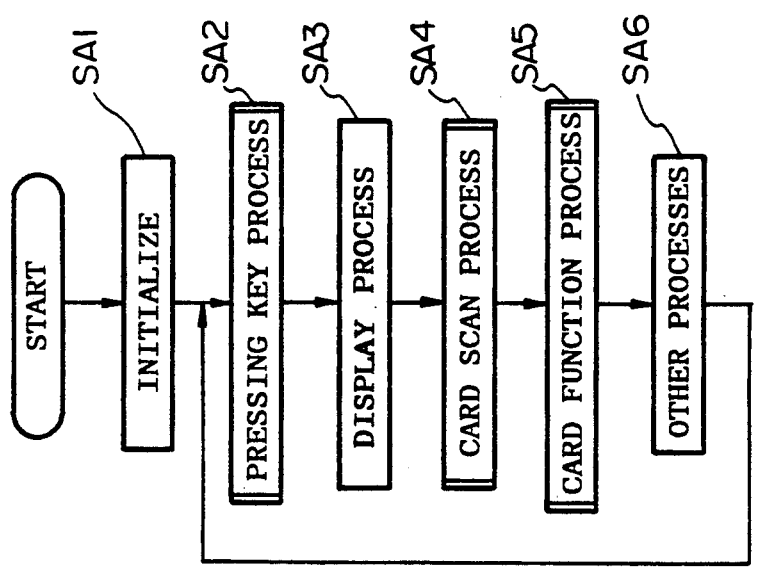
FIG. 5 is a flow chart showing the main routines for explaining the operation according to the construction of the same preferred embodiment.

When a power supply is connected, the flow chart shown in FIG. 5 is performed by CPU3. This routine is the main routine. First, in step SA1 all variables and registers are initialized. Next, step SA2 follows and the pressing key process shown in FIG. 6 is carried out.

Figure 6:
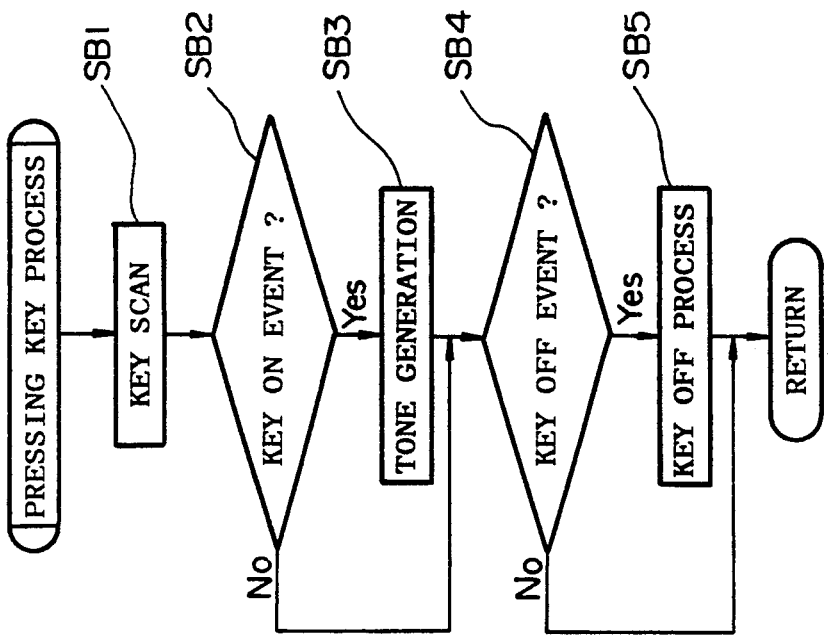
FIG. 6 is a flowchart for explaining the key pressing process of the same preferred embodiment.

In the pressing key process of FIG. 6, first, all keys of keyboard 1 are scanned in step SB1. Next, in step SB2 it is decided whether or not a key-On event occurred. Then, if a key event occurred, in this step SB2 the decision result becomes Yes and step SB3 follows. In step SB3 the tone generation process is carried out according to the key where the key event occurred.

On the other hand, if the decision result in SB2 is No, or the process of aforementioned step SB3 is terminated, step SB4 follows. In step SB4 it is decided whether or not a key-Off event occurred. Then, if there was a key-Off event, the decision result in step SB4 becomes Yes and step SB5 follows next. In step SB5 the key-off process is carried out for the key for which the key event occurred.

If on the other hand the decision result in step SB4 is No, or if the process of aforementioned step SB5 is terminated, aforementioned pressing key process is terminated and there is a jump back to the main routine shown in figure 5.

Figure 7:
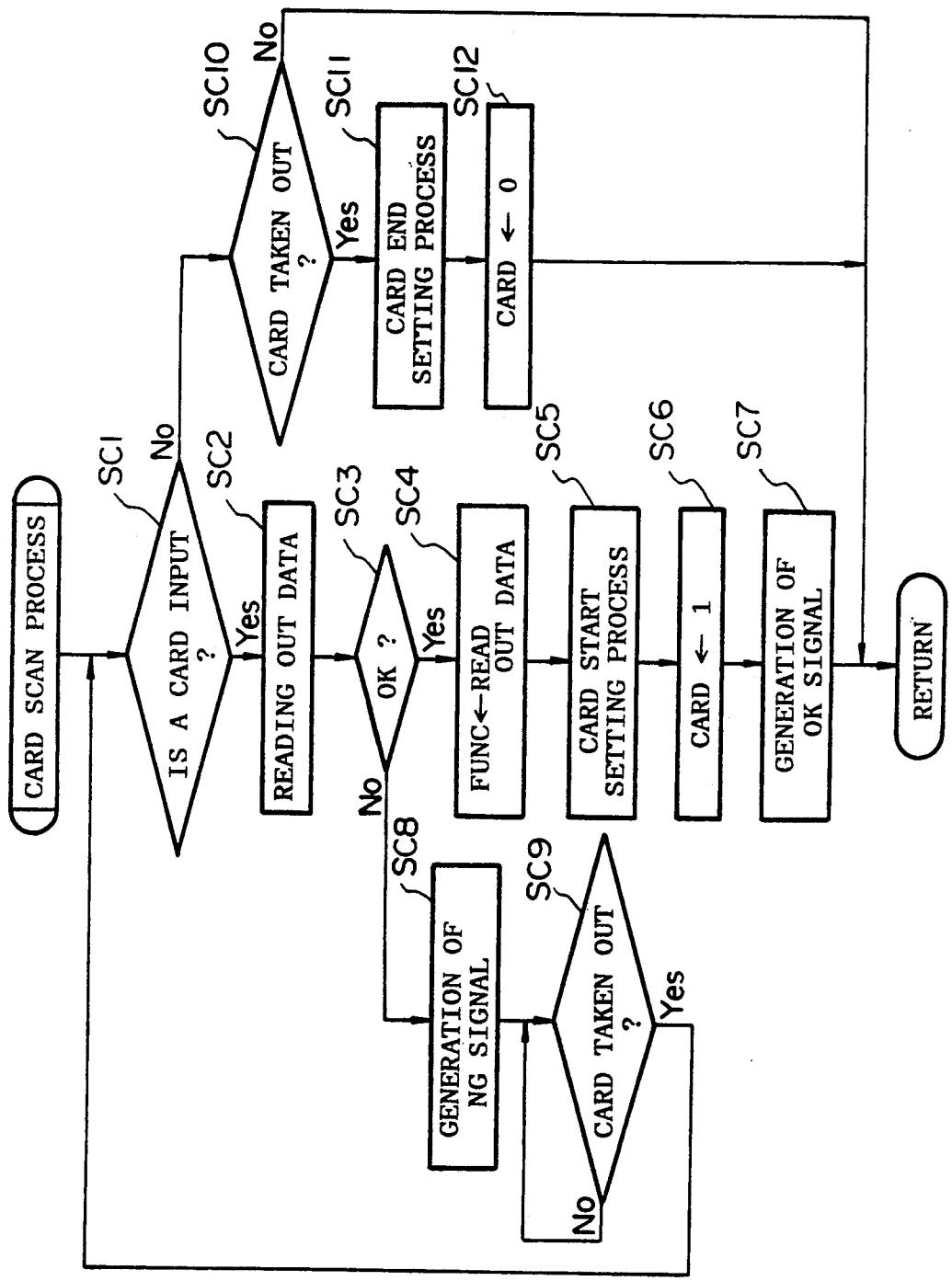
FIG. 7 is a flowchart for explaining the card scan process of the same preferred embodiment.

In the main routine, step SA3 follows next. In step SA3 the action conditions of the aforementioned device are displayed. Then step SA4 follows next. In step SA4 the card scan process is carried out as shown in FIG. 7. In the card scan process of FIG. 7, first it is decided in step SC1 whether or not card 21a is input into card slot part 20. Then, if the decision result in this step SC1 is Yes, step SC2 follows next. In step SC2, the bar code imprinted on the back side of card 21a is read out. Then SC3 follows next and it is decided whether or not the outreading of the bar code data was done correctly. If the decision result in step SC3 was No, in other words, if the reading the reading was not carried out correctly, step SC8 follows next. In step SC8, a beep tone or something alike is generated for indicating that the bar code read out was not carried out correctly and the take-out of card 21a is urged.

Next, in step SC9 it is decided whether or not card 21a was taken out. Here, if card 21a has not been taken out the decision result in step SC9 becomes No and there is a loop back to said step SC9 until it is taken out. Then, when card 21a has been taken out, the decision result in step SC9 becomes Yes and there is a jump back to step SC1. Thus, aforementioned routine is repeated until the bar code reading is carried out correctly.

On the other hand, if the decision result in step SC3 is Yes, in other words, if the bar code reading was carried out correctly, step SC4 follows next. In step SC4, the read out data, in other words, the card number is temporarily stored in the FUNC register. Next, in step SC5 the data of register FUNC (card number) are referred to, and according to the kind of card the parts like the registers used for this function are initialized. Even if card 21a is not inserted, for making the function selection switches SW1-SW12 work, at that time the used registers are set to a default value (initializing values).

Then, step SC6 follows next and register CARD is set to 1. This register CARD is a flag indicating the input condition of card 21a. Then, step SC7 follows next and for indicating that function selection switches SW1-SW12 are able to perform this function, a certain tone is played, aforementioned card scan process is terminated and there is a jump back to the main routine. In this preferred embodiment a "voice selector" card 21a is input.

On the other hand, if card 21a is not input, the decision result in step SC1 is No and step SC10 follows next. In step SC10 it is decided whether or not card 21a has been taken out. Then, if the decision result in this step SC10 is No, aforementioned routine is simply terminated and there is a jump back to the main routine.

On the other hand, if the decision result in step SC10 is Yes, in other words, if card 21a has been taken out, step SC11 follows next, and so that the function selection switches SW1-SW12 can carry the function of No card, the card termination setting procedure for setting the default values is carried out. Then, step SC12 follows next, the register CARD is set to 0 and indicates the condition that card 21a has not been input. Then, aforementioned process is terminated and there is jump back to the main routine.

Figure 8:
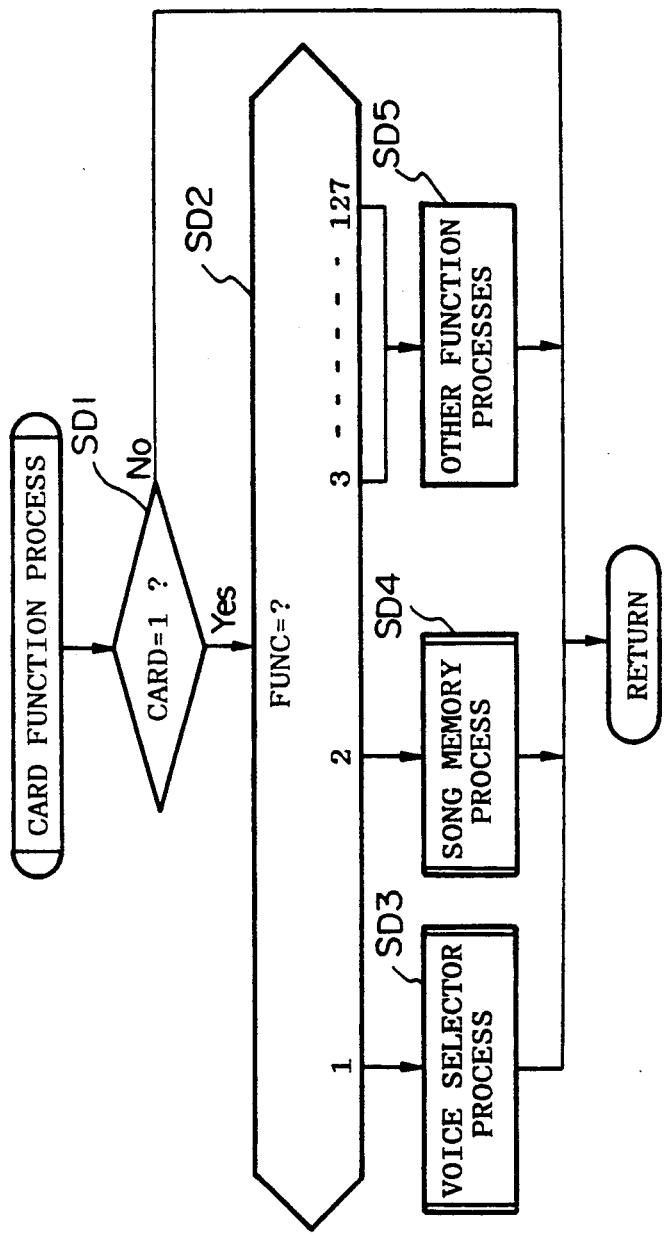
FIG. 8 is flowchart for explaining the card function process of the same preferred embodiment.

When the card scan process is terminated, in the main routine step SA5 follows next and the card function process shown in FIG. 8 is carried out. In this card function process, first it is decided in step SD1 whether or not register CARD is 1. If card 21a is not being inserted and therefore register CARD is 0, the decision result in step SD1 becomes No, said routine is just terminated and there is a jump back to the main routine.

Figure 9:
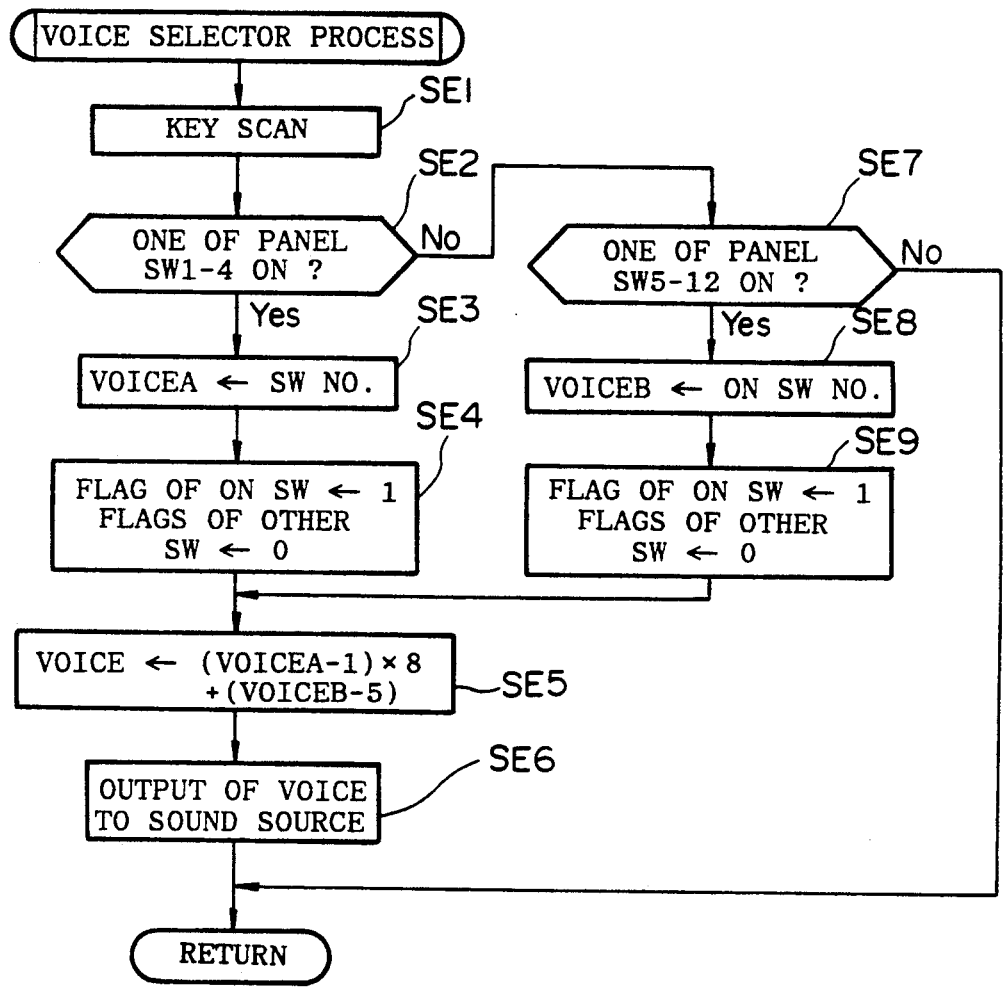
FIG. 9 is a flowchart for explaining the voice selection process of the same preferred embodiment.

On the other hand, if card 21a is inserted, the decision result in step SD1 becomes Yes and step SD2 follows next. In step SD2 register FUNC is referred to and it is decided what kind of card has been inserted. For this example, since "voice selector" card 21a (FUNC equals 1) is being inserted as described above, step SD3 follows next. In step SD3 the voice selection process shown in FIG. 9 is carried out.

In the voice selection process, function selection switches SW1-SW12 are scanned in step SE1. Next, in step SE2 it is decided whether at least one of the function selection switches SW1-SW4 is on. If neither of the function selection switches SW1-SW4 is in touch down position, the decision result of step SE2 becomes No and step SE7 follows next. In step SE7 it is decided whether at least one of the function selection switches SW5-SW12 is switched on. If neither of the function selection switches SW5-SW12 is in touch down position, aforementioned routine is terminated and there is a jump back to the main routine.

On the other hand, if, for example, function selection switch SW1 is pressed down and the piano system in FIG. 3 should be selected, the decision result in step SE2 becomes Yes and step SE3 follows next. Then, in step SE3 aforementioned switch number is stored in register VOICEA. In this example, 1 is stored in register VOICEA. Then, step SE4 follows next and switch flags of the pushed down function selection switches SW1-SW4 go up to 1. Accordingly, for this example, the flag of the function selection switch SW1 goes to 1. These flags are used as control flags for switching on an LED provided in the function selection switches SW1 to SW4 and flash in case of 1, and are switched off in case of 0.

When, for example, aforementioned piano system is selected and furthermore piano 1 should be selected, when function selection switch SW5 is pressed the decision result in step SE7 is Yes and step SE8 follows next. Then in step SE8 aforementioned switch number is stored in register VOICEB. In this case, 5 is stored in register VOICEB.

Then, step SE9 follows next and the flags of the pressed down function selection switches SW5 to SW12 go to 1. Accordingly, for this example, the flag of the function selection switch SW5 goes to 1. This flag is used as a control flag for flashing an LED provided similarly in the function selection switches SW5 to SW12.

Then, when the processes of steps SE4 or SE9 are terminated, step SE5 follows next. In step SE5 the calculation result of the equation (VOICEA−1)×8+(VOICEB−5) is input into register VOICE. This equation is for distinguishing which of the 32 kinds of performance musical instruments coming from the combination of switching numbers has been selected and for this case the value 0 is input into register VOICE.

Then step SE6 follows next and the value of register VOICE is supplied to sound source circuit 10. In sound source circuit 10, the tone color according to the value of the aforementioned register VOICE, in this case the creation of a piano sound, is tonalized by speaker SP. Then, if for example, function selection switches SW2 and SW12 are pressed ("2"−1)×8+("12"−5), that is 15, is stored in register VOICE. In this case a guitar sound is created. The switches on the right side (SW9-SW12) are for selecting the voice of the lower row of aforementioned frame. Then, when the process of step SA6 is terminated, there is a jump back to the main routine.

In the main routine, step SA6 follows next and another process for sound creation is carried out. Thereafter, there is jump back to step SA1 and the aforementioned process is repeatedly carried out.

Song memory card

Figure 10:
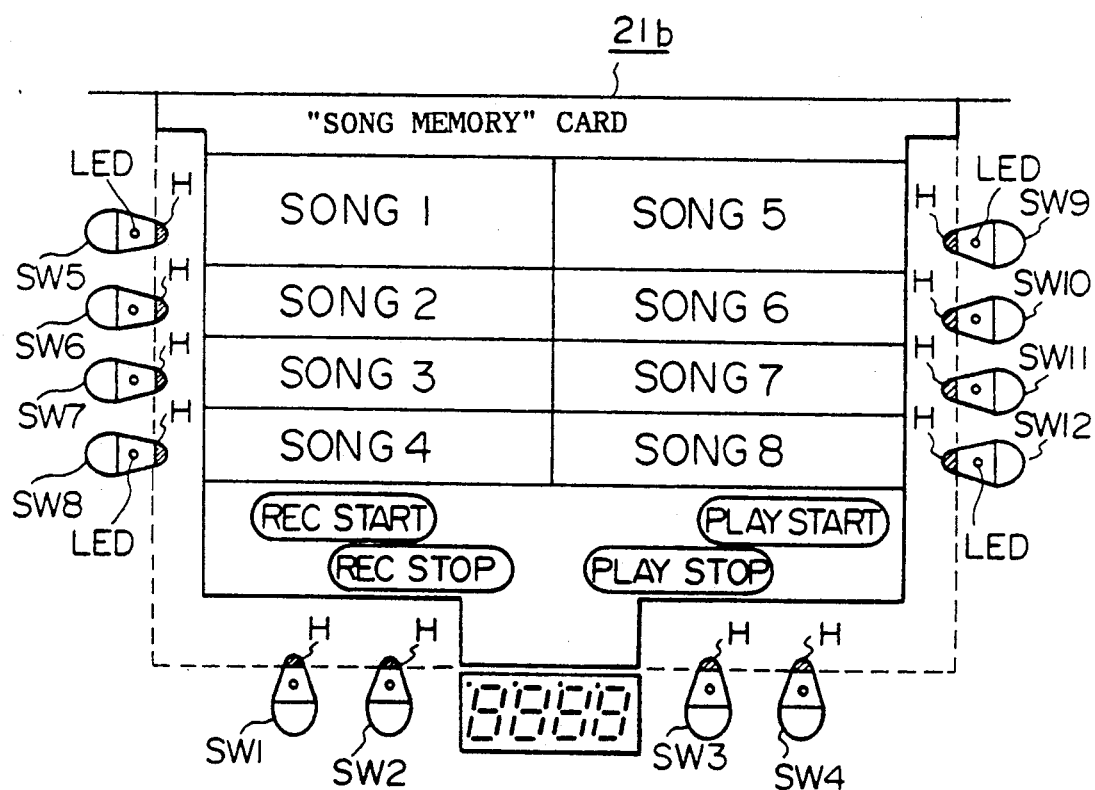
FIG. 10 is a front view showing the relation between the electronic musical instrument's card slot and the song memory card put into mentioned card slot part in the same preferred embodiment.

Next, for the case when instead of the aforementioned voice selector card a song memory card 21b is inserted, an explanation is given by referring to FIG. 10. The song memory is a storage medium for storing the performance of the player. It normally provides a plurality of regions wherein different performances may be stored. Then, after the performance the performance information stored in the song memory can be read out and replayed.

An explanation is given on the "song memory" card 21b shown in FIG. 10 in a position where it is inserted in card slot part 20. In this figure on card 21b "REC START" is displayed for indicating the recording start according to the function selection switch SW1. In other words, from the hole H supplied in the vicinity of function selection switch SW1, a color equal to the letter color (or background color) of "REC START" can be seen. Hereinafter, similarly "REC STOP" is assigned to function selection switch SW2, "PLAY STOP" is assigned to function selection SW3, "PLAY START" to function selection switch SW4 and in the vicinity of the operation element through hole H appears a mark of the same color in which the function is stated on the card 21b.

Furthermore, similarly "SONG 1" of the first song memory is assigned to function selection switch SW5, "SONG 2" of the song memory to function selection switch SW6, similarly, "SONG 3" to function selection switch SW7, "SONG 4" to function selection switch SW8, "SONG 5" to function selection switch SW9, "SONG 6" to function selection switch SW10, "SONG 7" to function selection switch SW11 and "SONG 8" to function selection switch SW12.

When the aforementioned "song memory" card 21b is inserted with the aforementioned card scanning process, register FUNC is loaded with 2 in step SC4. Then, in step SC5 the initial values according to aforementioned "song memory" card 21b are placed into the registers used for the functions so that the function selection switches SW1-SW12 can carry out the "song memory" function.

Figure 11:
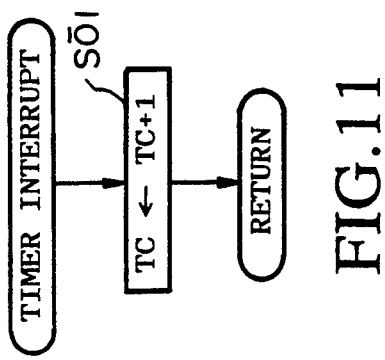
FIG. 11 is a flowchart for explaining the time interrupt process of the same preferred embodiment.
Figure 12:
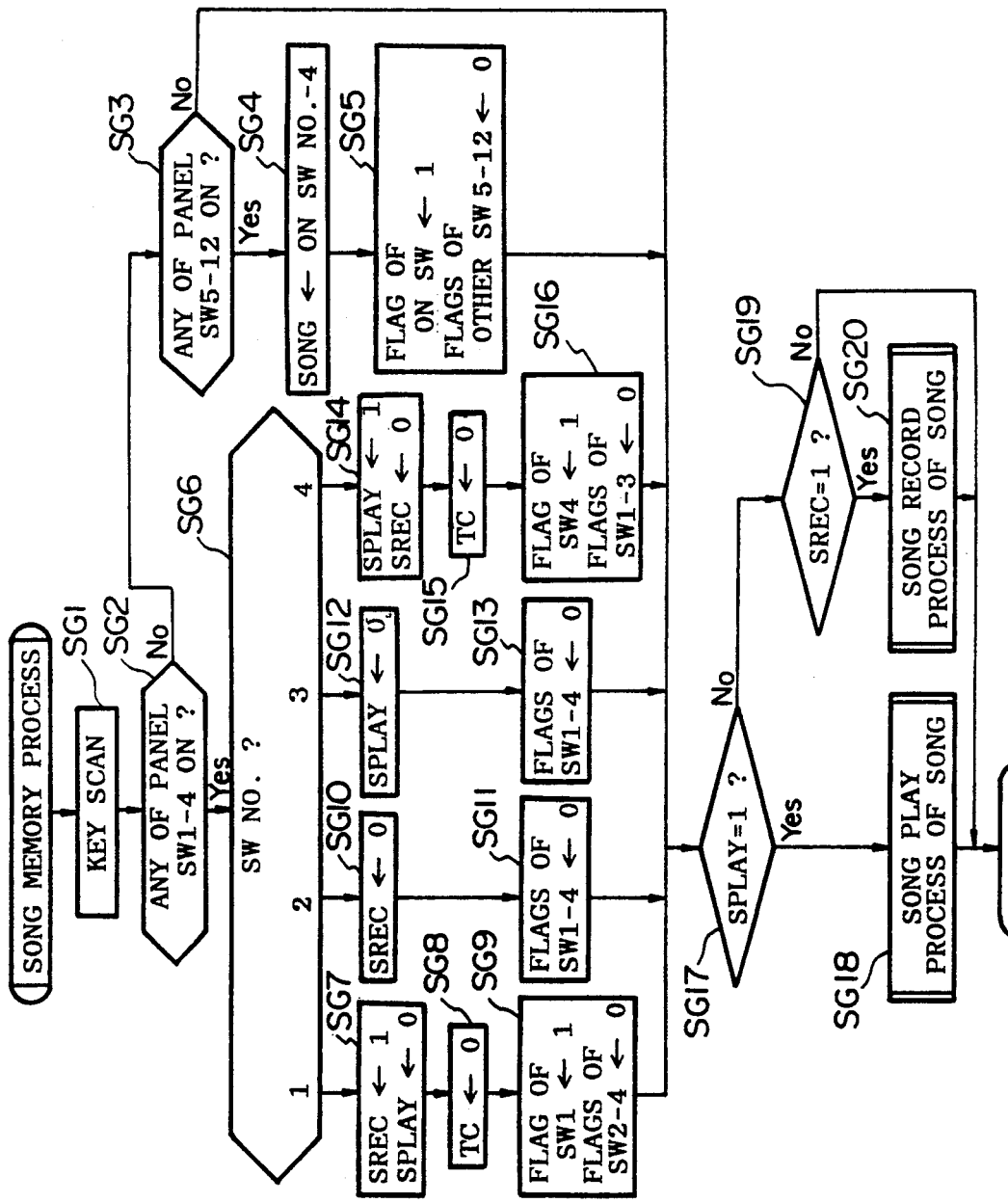
FIG. 12 is a flowchart for explaining the song memory process of the same preferred embodiment.

Next, in the card function process as shown in FIG. 8, step SD4 comes after step SD2 and the song memory process is carried out as indicated in FIG. 12. In aforementioned electronic musical instrument, fixed time intervals are generated by a timer and in step SF1 of the time interrupt process shown in FIG. 11, tempoclock TC is incremented.

In the song memory process shown in FIG. 12, function selection switches SW1-SW12 are scanned in step SG1. For selecting the song memory, the player first pushes down, for example, function selection switch SW8. In step SG2 it is decided whether or not one of the function selection switches SW1-SW4 is on. In this case, since the one pressed down is function selection switch SW8, the decision result of step SG2 becomes No and SG3 follows next. In step SG3 it is decided whether or not one of the function selection switches SW5-SW12 is on. In this case, the decision result in step SG3 is Yes and step SG4 follows next. In step SG4 the value (switch number - 4) according to the switch number of the pressed function selection switch is assigned to register SONG. For this example, 4 (8−4=4) is assigned to register SONG.

Then, step SG5 follows next and the flag of function selection switch SW8 is set to 1 and the other flags of function selection switches SW5-SW12 are set to 0. These flags are used as control flags for illuminating LEDs provided in the function selection switches SW5-SW12, where they are illuminated in case the flags are 1 and switched off when 0.

Then, step SG17 follows and it is determined whether or not flag SPLAY is 1. This flag SPLAY indicates a play process and since in this step it is 0, the decision result in the aforementioned SG17 becomes No and step SG19 follows next. In this step SG19 it is decided whether or not flag SREC is 1. This flag SREC indicates a recording process and at this step since it is 0, the decision result in step SG19 becomes No and the aforementioned process is terminated and followed by a jump back to the main routine. Then, again during the card function process aforementioned song memory process is carried out. In step SG1 and SG2 aforementioned process and a similar process are carried out. For example, for carrying out a "REC START", function selection switch SW1 is pressed down. Accordingly, the decision result in step SG2 becomes Yes and step SG6 follows next. In step SG6 it is decided which of the switch numbers 1 to 4 are present. In this case, since switch number 1 is present, step SG7 follows next. In step SG7, flag SREC is set to 1 and flag SPLAY to 0.

Then, step SG8 follows next and tempoclock TC is set to 0. Then, in step SG9 the flag of function selection switch SW1 is set to 1, and the other flags of function selection switches SW2-SW4 are set to 0. These flags are used as control flags for illuminating an LED provided in the function selection switches SW1-SW4. They are illuminated if the flags are 1, and switched off in case of 0.

Then, step SG17 follows next and then it is decided whether or not flag SPLAY is 1. In this case, since flag SPLAY is 0, the decision result in step SG17 is No and step SG19 follows next. In step SG19, it is decided whether or not flag SREC is 1. In this case, since flag SREC is 1, the decision result in step SG19 becomes Yes and step SG 20 follows next. In step SG20 the performance information is stored in the song memory according to register SONG. For this case, since the register SONG is 4, it is stored in the 4th song memory.

Next, the performance stops, and for stopping the recording, the function selection switch SW2 of "REC STOP" is pressed down. In this case, since the switch number in step SG6 is 2, step SG10 follows next. In step SG10 flag SREC is set to 0 and step SG11 follows next. In step SG11 the flags of function selection switches SW1-SW4 are set to 0 and the corresponding LEDs are switched off.

Then, step SG17 follows next. The decision result of this step SG17 becomes No and step SG19 follows next. The decision result in this step SG19 is No and aforementioned song memory process is terminated. Thus, the recording process is terminated.

Next, for playing the recorded performance, the function selection switch SW4 of "PLAY START" is pressed down. In this case, since the switching number is set to 4 in step SG6, step SG14 follows next. In step SG14, flag SPLAY is set to 1 and flag SREC to 0. Then step SG15 follows next and in this step SG15 the tempoclock TC is set to 0. Then, in step SG16 the flag of function selection switch SW4 is set to 1, the according LED is switched on, the flags of the function selection switches SW1 to SW3 are set to 0 and their according LEDs are switched off.

Then, step SG17 follows next. The decision result of this step SG17 becomes Yes and step SG18 follows next. In step SG18 the performance information stored in the song memory according to register SONG is played. In this case, since register SONG equals 8, the performance stored in the 8th song memory is being played.

Then, for stopping the play function, selection switch SW3 of "PLAY STOP" is pressed down, the switch number is set to 3 in step SG6 and step SG12 follows next. In step SG12 flag SPLAY is set to 0. Then, step SG13 follows next. In this step SG13 the flags of the function selection switches SW1 to SW4 are set to 0.

Then, step SG17 follows next. The decision result of this step SG17 becomes No and step SG19 follows next. In step SG19 the decision result becomes No and the song memory process is terminated. Thus the revival process is terminated.

Melody quiz card

Figure 13:
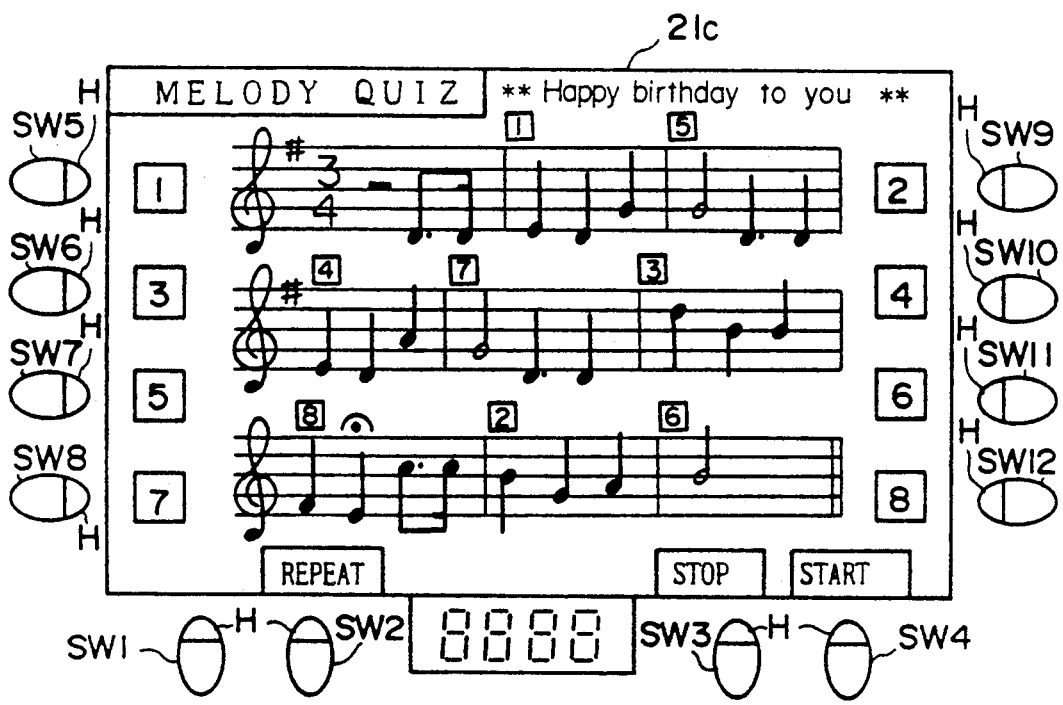
FIG. 13 is a front view of "a melody quiz" card for pointing at the right bar of a performed melody and put into a card slot part in the same preferred embodiment.

Next, an explanation on the "melody quiz" card 21c, which has different functions, is given by referring to FIG. 13. On the surface of this card 21c in the figure notes are written and each bar of notes corresponds to one of the function selection switches SW5 to SW12. To the function selection switches SW1 to SW4, the functions of play start, repeat, next and stop are successively assigned. When the quiz is started, a melody of a bar out of the melody of these notes is performed and the student guesses the bar of the performed melody, and answers by pressing one of the aforementioned function selection switches SW5 to SW12 according to the bar he thinks was performed. When he wants to hear it again, he presses the function selection switch SW2 to which the repeat function is assigned. When the learning process (program) is finished, the melody may be performed through all bars automatically and on display circuit 12 the score according to the right hit ratio and the frequency for pressing the function selection switch SW2 (speed) can be displayed.

Hereinafter, an explanation on the action of the preferred embodiment is given by referring to the flowchart shown in FIGS. 14 through 19.

Figure 14:
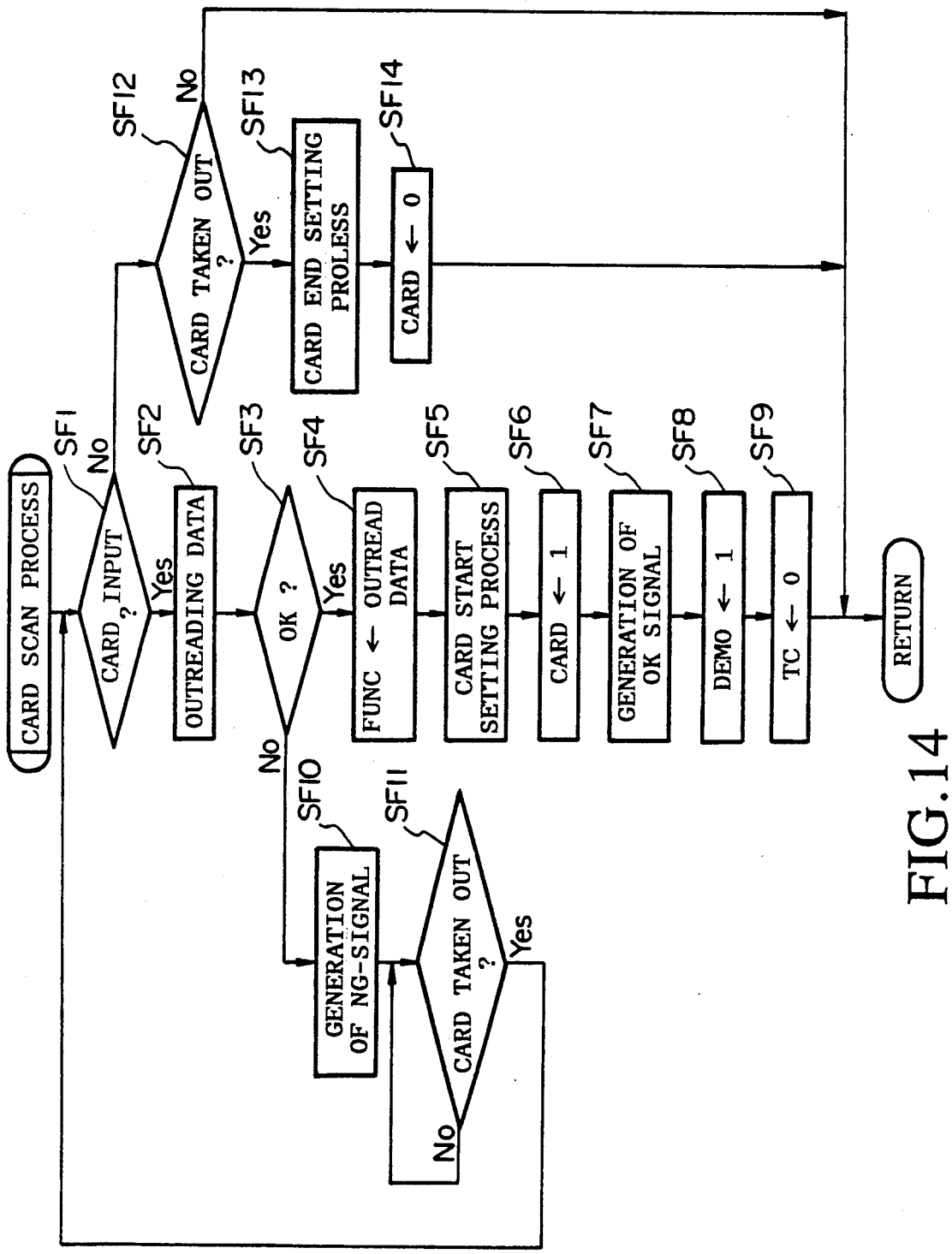
FIG. 14 is a flowchart for explaining the card scan process when "a melody quiz" card is input.

When the power source is plugged in, similarly to the process of the aforementioned "voice selector" card 21a, the flow-charts shown in FIGS. 5 and 6 are carried out by CPU3. However, in step SA4 of the main routine shown in FIG. 5, the card scan process shown in FIG. 14 is carried out. In the card scan process of FIG. 14, steps SF1 to SF7 are similar to the process of steps SC1 to SC7 in the card scan process shown in FIG. 7, whereby SF10, SF11 correspond to SC8 and SC9 respectively, and SF12, SF13, SF14 correspond to SC10, SC11 and SC12. The points of difference are that in order to indicate that it became possible to carry out the functions of function selection switches SW1 to SW12 in step SF7, after a certain tone had been generated, step SF8 follows next, register DEM is set to 0, and further in step SF9 tempoclock TC is reset to 0.

Aforementioned tempoclock TC is incremented in step SO of the timer interrupt routine shown in FIG. 11, which is carried out by an interrupt signal generated in a fixed time interval.

On the other hand, when card 21c is not inserted, the decision result in step SO becomes No and after the process in step SF12 to SF14 according to steps SC10 to SC12 in FIG. 7 has been carried out, there is a jump back to the main routine.

Figure 15:
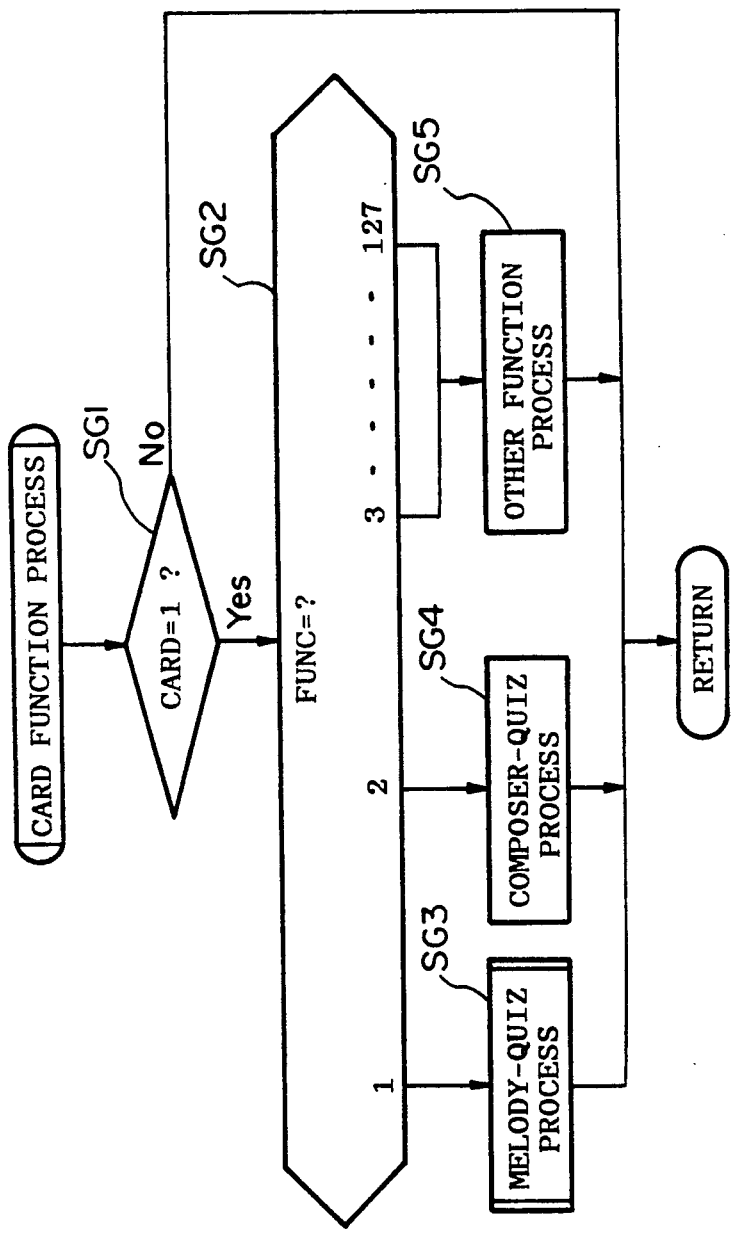
FIG. 15 is a flowchart for explaining the card function process of "a melody quiz" card.

When the card scan process is terminated, in the main routine step SA5, shown in FIG. 5, follows next and the card function process in FIG. 15 is carried out. In this card function process, it is decided in step SG1 whether register CARD equals 1. If card 21c is not inserted, and since register CARD equals 0, the decision result in step SG1 becomes No, the routine is terminated and there is a jump back to the main routine.

Figure 16:
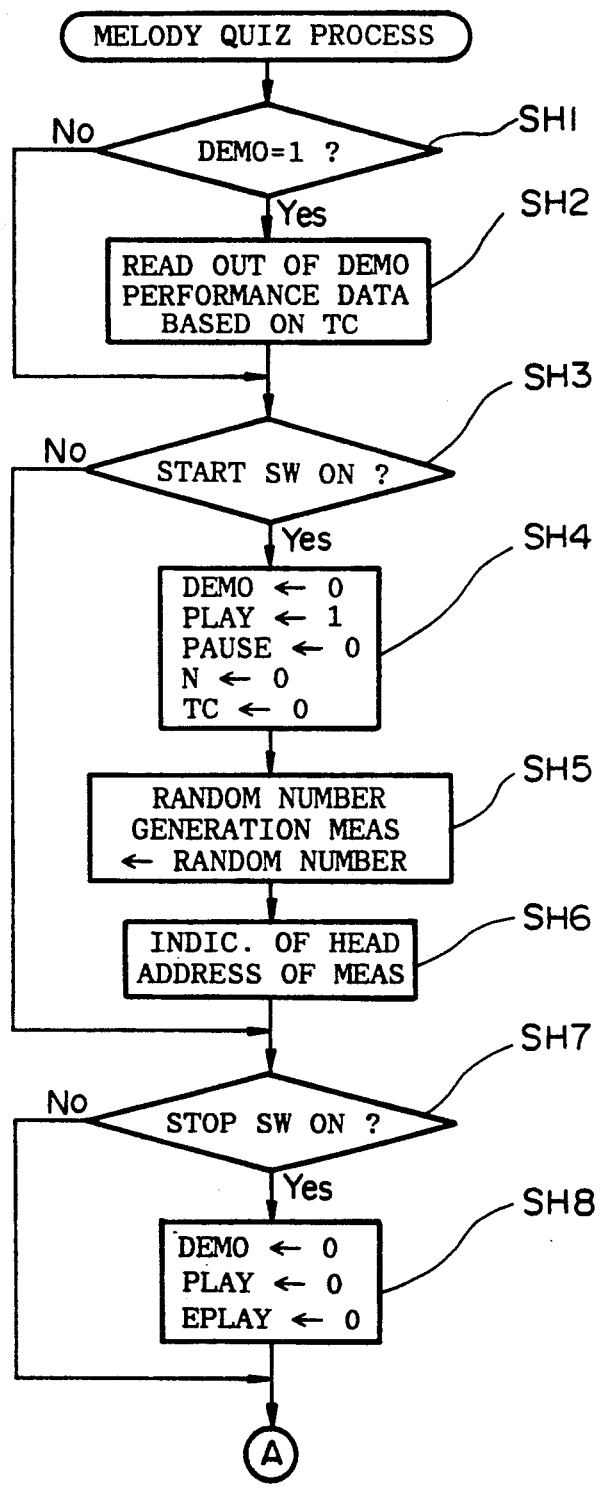
FIG. 16 is a flowchart for explaining the melody quiz process of "a melody quiz" card.

On the other hand, if card 21c is inserted, the decision result in step SG1 is Yes and step SG2 follows next. In step SG2, register FUNC is referred to and it is decided what kind of card is being inserted. In this example, the aforementioned "melody quiz" card 21c is inserted and step SG3 follows next. In step SG3 the melody quiz procedure shown in FIG. 16 is performed.

In the melody quiz process, first it is decided in step SH1 whether the register DEMO equals 1. Then, if the decision result in step SH1 is Yes, in step SH2 the demo performance data based on the tempoclock TC are read out.

On the other hand, if the decision result in step SH1 is No, or in case of the termination of aforementioned process of step SH2, step SH3 follows next. In step SH3 it is decided whether or not the start switch (function selection switch SW4) is on. Then, in case the decision result in case SH3 is Yes, step SH4 follows next. In step SH4, register DEMO is loaded with 0 and the demo performance is stopped. Then, 1 is written into quiz play flag PLAY, and pause flag PAUSE, register N indicating the quiz continuation position and tempoclock TC are set to 0 respectively. Then, step SH5 follows next, a random number between 1 and 8 is generated and written into the bar position MEAS. Then, in step SH6 the head address of the performance data shown by the bar position MEAS is indicated.

Figure 18:
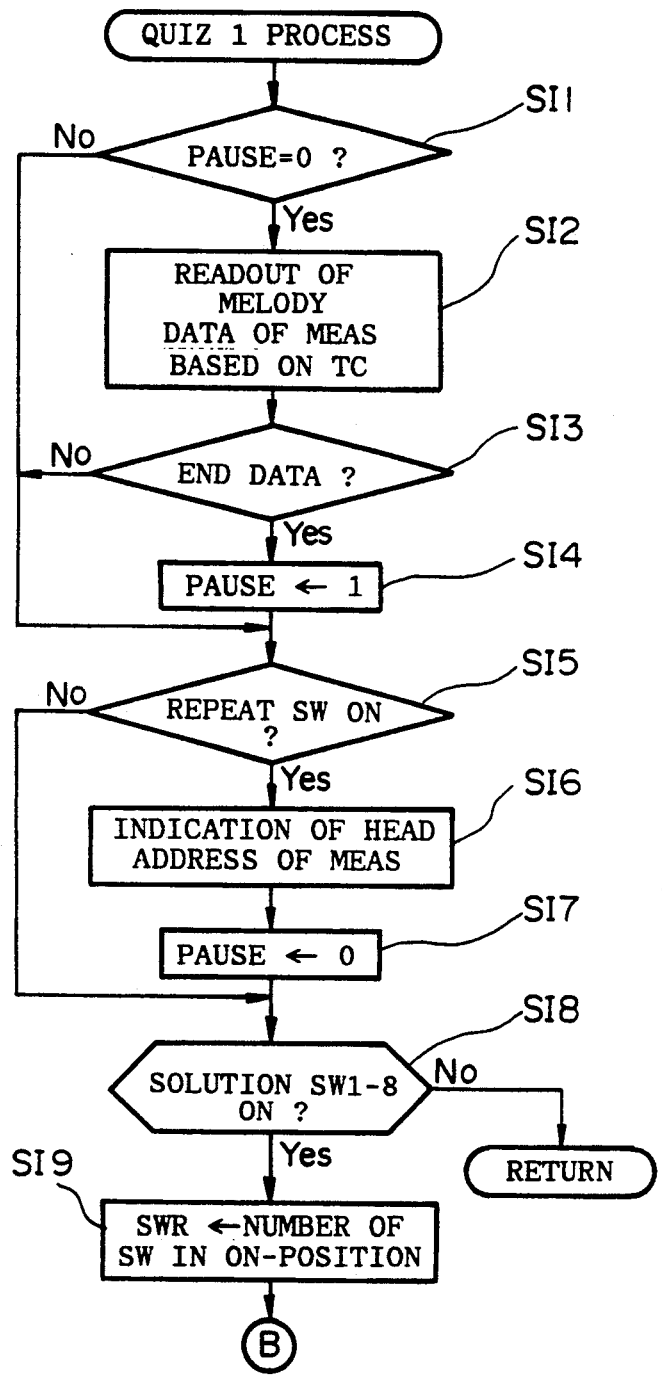
FIG. 18 is a flowchart for explaining the quiz 1 process of "a melody quiz" card.
Figure 19:
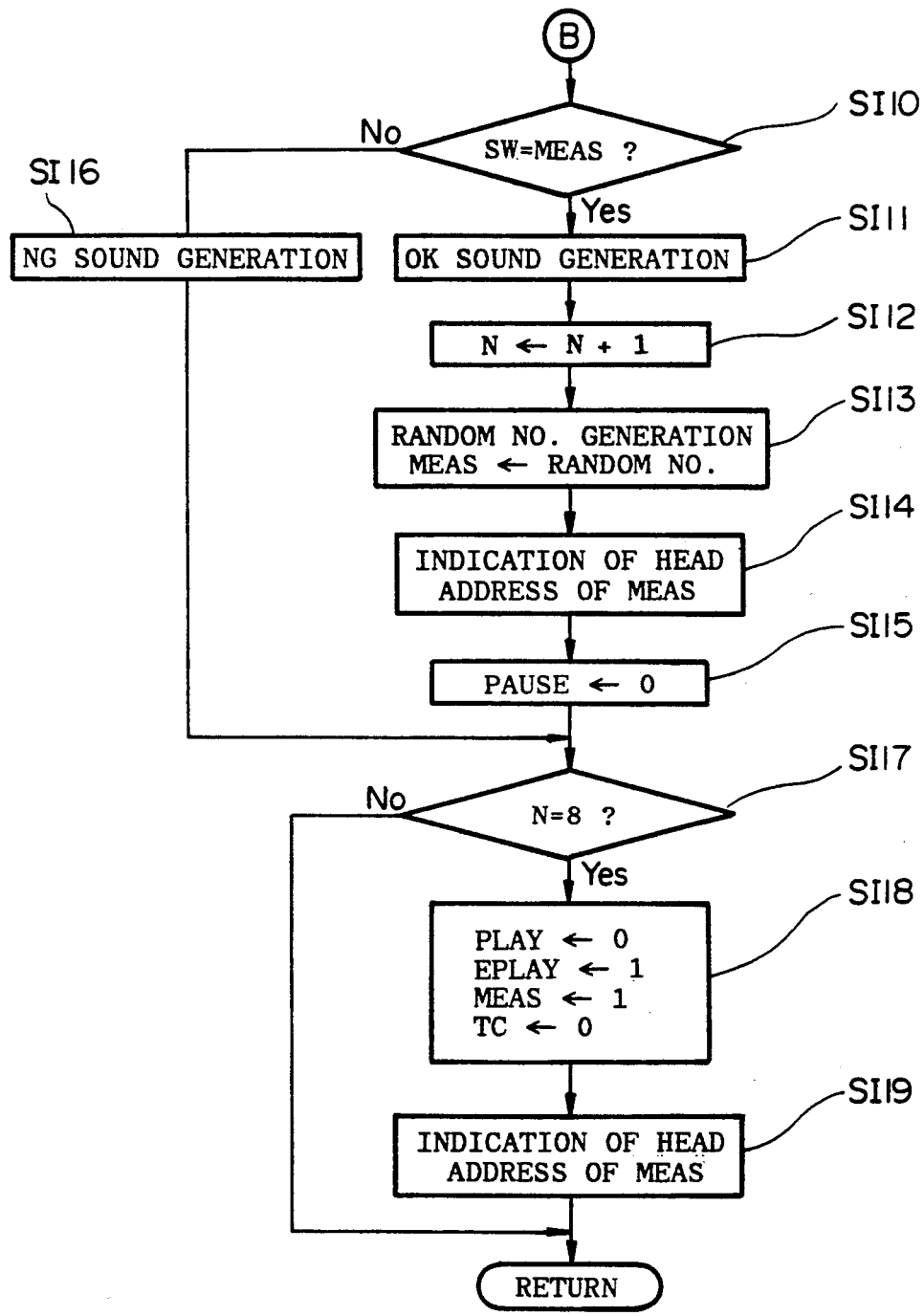
FIG. 19 is a flowchart for explaining the quiz 1 process of "a melody quiz" card.

On the other hand, if the decision result in step SH3 is No, or in case of termination of the aforementioned process in step SH6, step SH7 follows next. In step SH7 it is decided whether or not the stop switch (function selection switch SW3) is on. Then, if the decision result in step SH7 is Yes, step SH8 follows next. In step SH8 register DEMO, quiz play flag PLAY and quiz end play flag EPLAY are set to zero respectively. On the other hand, if the decision result in step SH7 is No or in case the process in step SH8 has been terminated, step SH9 shown in FIG. 17 follows next. In step SH9 it is decided whether quiz play flag PLAY is 1. Then, if the decision result in step SH9 is Yes, step SH10 follows next. In step SH10 quiz 1 process shown in FIG. 18 and 19 is carried out.

In the quiz 1 process, first it is decided in step SI1 whether or not register Pause is equal to 0. Then, if the decision result in step SI1 is Yes, step SI2 follows next. In step SI2 the melody data shown in the bar position MEAS are read out from the ROM on the basis of tempoclock TC. Then, step SI3 follows next and it is decided whether not end data are present. Then, if the decision result in step SI3 is Yes, step SI4 follows next. In step SI4, 1 is loaded into PAUSE.

On the other hand, if the decision result in step SI1 or SI3 is No, or in case the process step SI4 has been terminated, step SI5 follows next. In step SI5, it is decided whether or not repeat switch SWR is on. Then, if the answer to the decision result in step SI5 is Yes, step SI6 follows next. In step SI6, the head address of the performance data shown by bar code position MEAS is indicated. Then step SI7 follows next and 0 written into register PAUSE.

On the other hand, if the decision result in step SI5 is No, or in case the process in aforementioned step SI7 has been terminated, step SI8 follows next. In step SI8, it is decided whether or not solution switches SW1 to SW8 have been pressed down. Then, if the decision result in step SI8 is No, there is a jump back to the melody process.

On the other hand, if the decision result SI8 is Yes, step SI9 follows next. In step SI9, the number of the pressed solution switches SW1 to SW8 is written into switch number register SWR and step SI10 follows next. In step SI10, it is decided whether or not switch number register SWR and bar position MEAS are equal. Then, if the decision result in step SI10 is Yes, step SI11 follows next.

In step SI11 an OK sound is generated which indicates the correctness of the solution. Then, step SI12 follows next and register N is incremented. Then, in step SI13 after a random number has been generated (this random number up to now excluded values used in the bar position MEAS) and is written to bar position MEAS Then, step SI14 follows next and the head address of the performance data showing the bar position MEAS is indicated. Then, in step SI15, zero is written into register PAUSE.

On the other hand, if the decision result in step SI10 is No, step SI16 follows next and an NG-sound (beep sound) is generated which indicates that the answer is wrong.

Then, if the process in step SI15 and SI16 is terminated, step SI17 follows next. In step SI17 it is decided whether or not register N became 8. Then, if the decision result in step SI17 is Yes, step SI18 follows next. In step SI18, zero is written into quiz play flag PLAY and tempoclock TC, and 1 is written into quiz end play flag EPLAY and bar position MEAS. This indicates that the end of the quiz has been reached and indicates the preparation for the ending performance. Next, in step SI19 the head address of the bar position MEAS is indicated.

On the other hand, if the decision result in step SI17 is No, or in case the process in step SI19 has been terminated, quiz 1 process is terminated and there is a jump back to the melody process.

Figure 17:
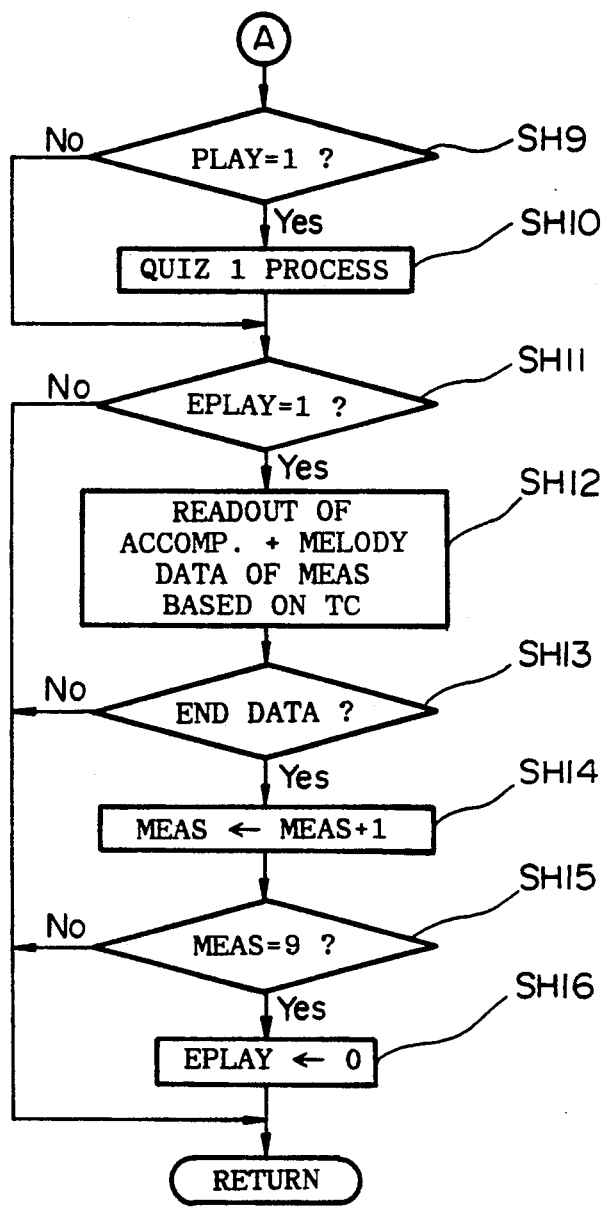
FIG. 17 is a flowchart for explaining the melody quiz process of "a melody quiz" card.

On the other hand, if the decision result in step SH9 is No, as indicated in FIG. 17, or in case quiz 1 process in step SH10 has been terminated and there was a return back to the aforementioned process, step SH11 follows next. In step SH11 it is decided whether or not quiz end play flag EPLAY equals 1. Then, if the decision result in step SH11 is Yes, step SH12 follows next. In this step SH12 the melody data shown in the bar position MEAS and the accompany data are read out on the bases of tempoclock TC. Then, step SH13 follows next. In step SH13 it is decided whether or not there exist end data. Then, if the decision result in step SH13 is Yes, step SH14 follows next. In step SH14 bar position MEAS is incremented. Then, in step SH15 it is decided whether or not bar position MEAS is equal 9. If the decision result in step SH15 is Yes, step SH16 follows next, quiz end play flag EPLAY is set to 0, aforementioned melody process is terminated, there is a jump back to the card function process and then a jump back to the main routine.

On the other hand, if the decision result in steps SH11, SH13, SH15 are No, aforementioned melody quiz process is terminated, there is a jump back to the card function process and then a jump back to the main routine.

In the main routine shown in FIG. 5, step SA6 follows next and another process for sound generation is carried out. Thereafter, there is a jump back to SA1 and aforementioned process is repeatedly carried out.

FM synthesizer card

Figure 20:
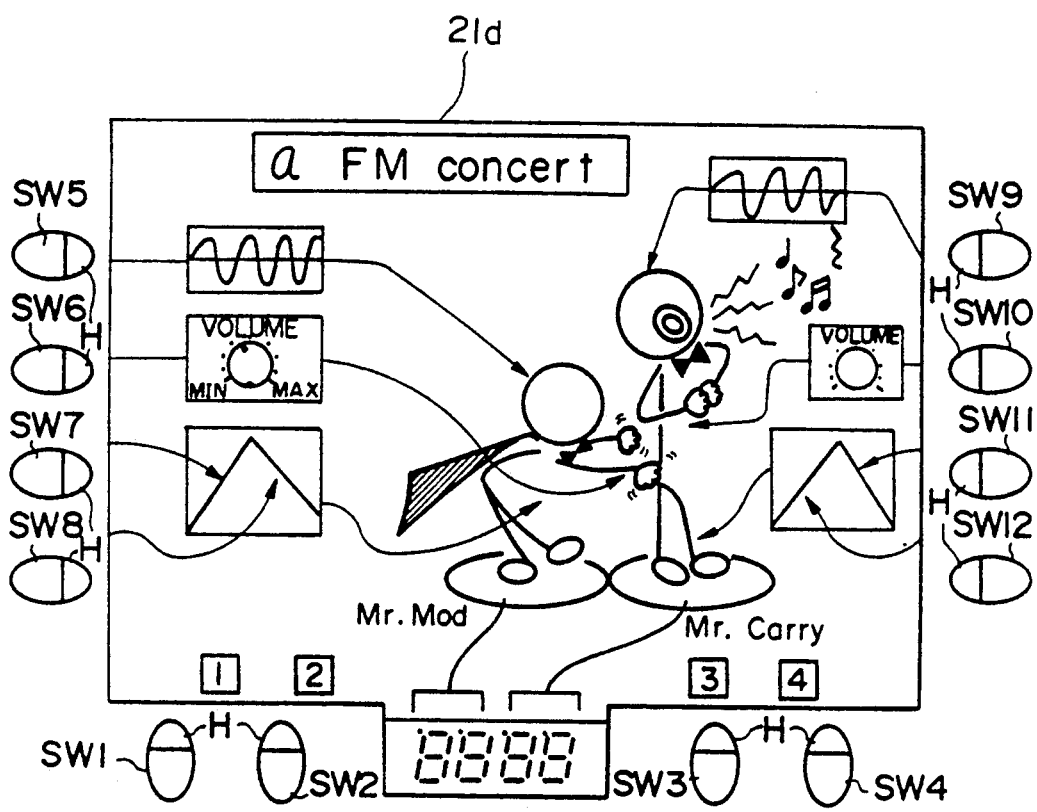
FIG. 20 is a top view of a "FM synthesizer" card for carrying out the sound manufacturing of an FM sound source.

Next, an explanation is given for the case when "FM synthesizer" card 21d is inserted, by referring to FIG. 20. When this card 21d is inserted, it becomes possible to create sounds of FM sound sources. To the function selection switches SW5, SW6, SW7 and SW8 on the left side, functions for changing the parameter of the modulator are assigned. Functions for changing the parameter of carrier are assigned to the function selection switches SW9, SW10, SW11 and SW12 on the right side. At the display the present value of the P parameter which changes is indicated (the left half is the modulator and the right half the carrier).

Like mentioned before, by changing inserted card 21d, the function of the function selection switches SW1 to SW12 can be changed. Besides this, there is an "accompaniment card" selecting the style of the automatic accompaniment, and an "effect card" for changing parameters which designate effects such as vibrato and reverb.

Composer quiz card

Figure 21:
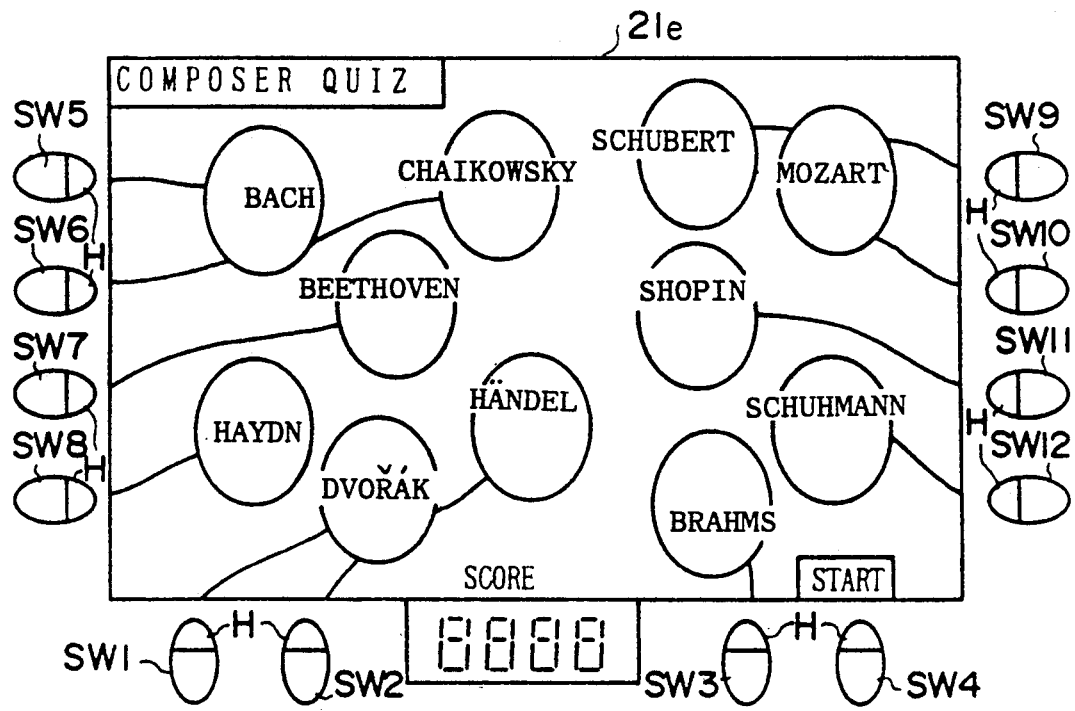
FIG. 21 is a top view of a card carrying out a composer quiz with an other card of the same preferred embodiment.

Next, an explanation is given for the case when the "composer quiz" card 21e is inserted, by referring to FIG. 21. This is a composer quiz and includes a card where the composer of an automatically performed melody has to be determined. This process is performed in step SG4 when variable FUNC equals 2, as indicated in FIG. 15.

When aforementioned card 21e is inserted, first, during the interval until the start switch (function selection switch SW4) is pressed down, the demo melody continues in a low volume. Then, when the start switch (function selection switch SW4) is pressed down, the demo melody stops and the game starts. When the game starts, first a part of the melody is performed. The student presses down one of the function selection switches SW1 to SW12 (except of function selection switch SW4) for which he thinks it is correct. If it is correct, a major chord is played for a short time, if it is not correct, a minor chord is played for a short time. Then, regarding the performed melody there are melodies for one composer and it is not decided which melody is being played. The whole number of questions is 10 and the score is displayed on a display. When full marks are obtained, a fanfare connecting one part of the whole melody is performed. Then, on the back of card 21b, the melody notes, the name of the melody and the name of the composer (and also such things as data) are written as the correct solution of the problem.

Style quiz card

Figure 22:
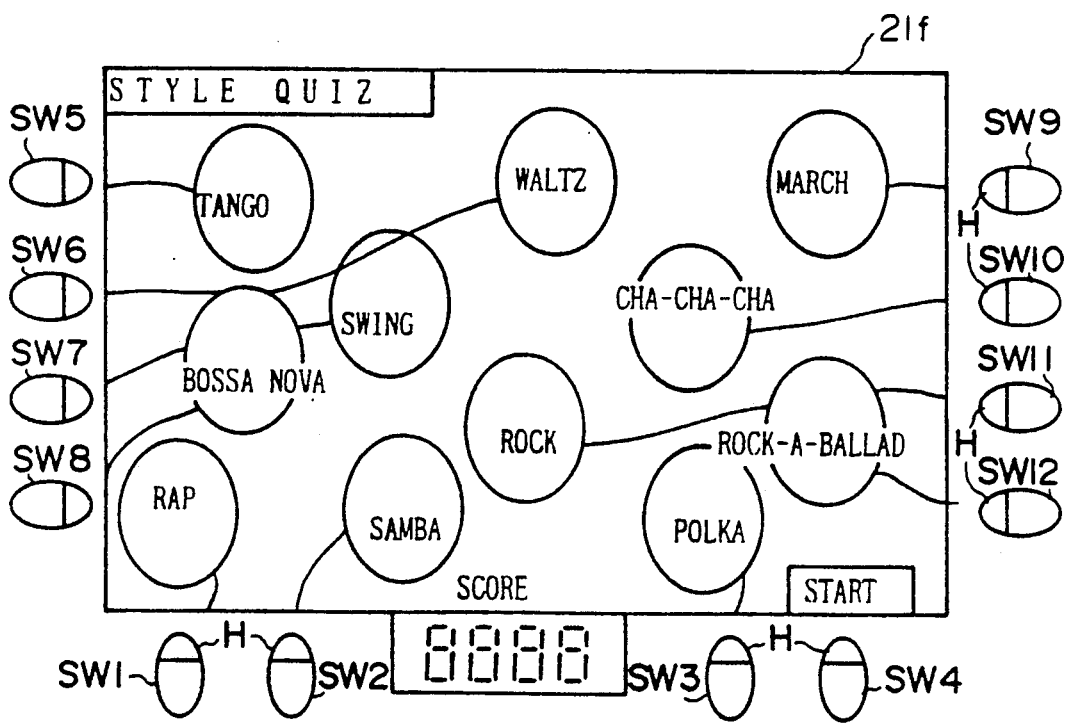
FIG. 22 is a top view of a card carrying out a style quiz at the same preferred embodiment.

Next, an explanation on the "style quiz" card 21f is given by referring to FIG. 22. This is a card for automatically performing rhythm style name checks. This process, for example, is carried out when variable FUNC equals 3, as indicated in FIG. 15.

When aforementioned card 21f is inserted, first the demo melody continues at a low volume during the time until a start switch (function selection SW4) is pressed down. Then, when the start switch is pressed down, the demo melody stops and the game starts. When the game starts, first a part of a melody is performed. The student presses down the one of the function selection switches SW1 to SW12 (except function selection switch SW4) which he thinks is correct. If it is correct, a major chord is played for a short time, and if it is not correct, a minor chord is played for short time. The number of questions is 10 and the score is displayed on a display. Then, when full marks are obtained, a fanfare connected to the whole part of the melody is performed.

Instrument quiz card

Figure 23:
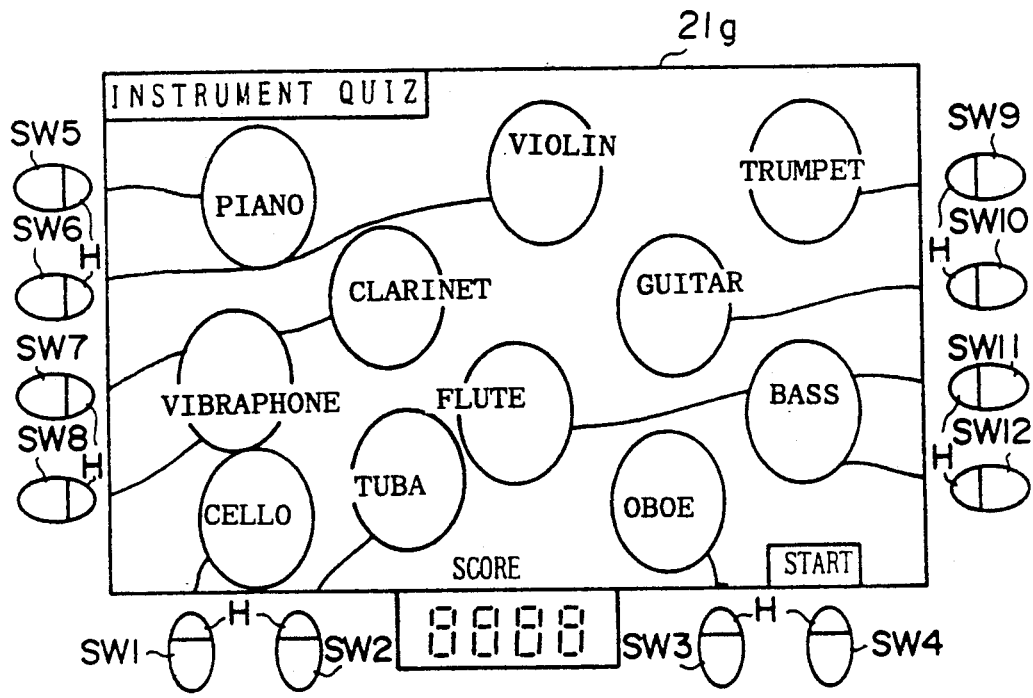
FIG. 23 is a top view of a card carrying out a musical instrument name quiz at the same preferred embodiment.

Next, an explanation on the "instrument quiz" card 21g is given by referring to FIG. 23. This card is for choosing the musical instrument which automatically performs a phrase. This process is carried out when, for example, as shown in FIG. 15, the variable FUNC is equal 4. The action by this card 21g is not explained since it is similar to the aforementioned "style quiz" card 21f.

Music around the world card

Figure 24:
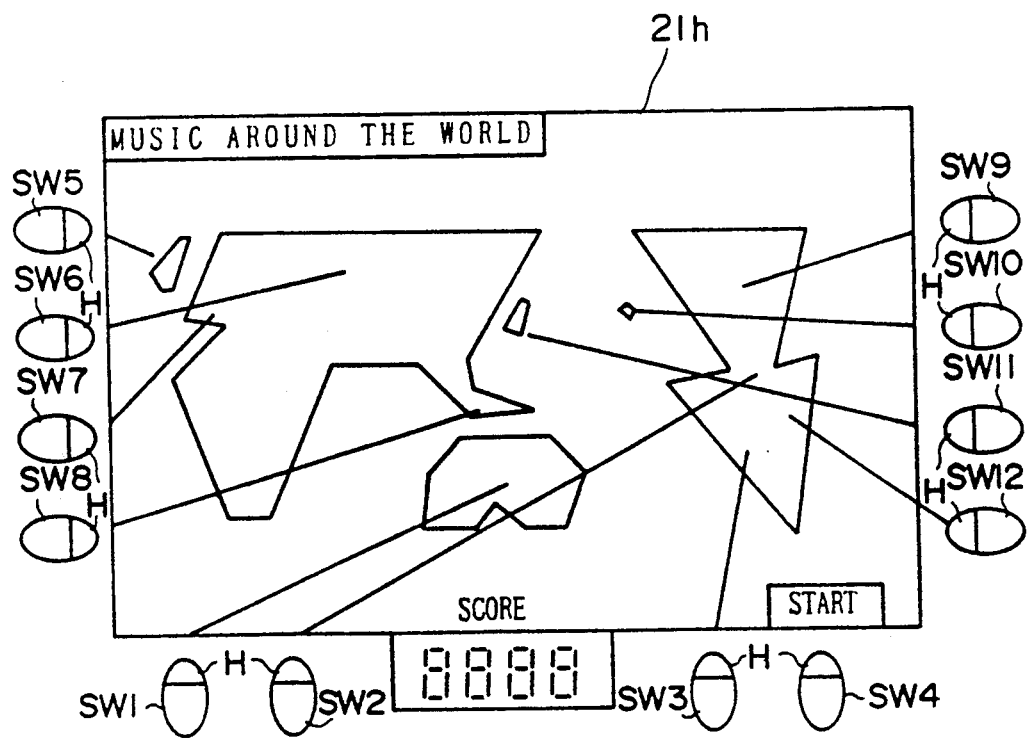
FIG. 24 is a top view of a card carrying out a land name quiz at the same preferred embodiment.

Next, an explanation on the "music around the world" card 21h is given by referring to FIG. 24. This card is for choosing the name of the country and location having a relation with the automatically performed melody. This process is, for example, performed, as shown in FIG. 15, when the variable FUNC is equal 5.

When aforementioned card 21h is inserted, the demo melody continues in low volume for the time until the start switch (function selection switch SW4) is pressed down. Then, when the start switch is pressed down, the demo melody stops and the game is started. When the game is started, first a part of a melody is performed. The student presses down the one of the function selection switches SW1 to SW12 (except function selection SW4) which he thinks is correct. If it is correct, a major chord is played for a short time, and if it is wrong, a minor chord is played for a short time. In the aforementioned preferred embodiment the question being asked may be related to somewhere between music and vision, like for example code tone and code name.

The function selection switches SW1 to SW12 are distinguished by colors. According to this color distinction the function selection switch corresponding parts of the card are also respectively distinguished by colors.

In the aforementioned preferred embodiment the identification method of card 21a is not limited to the use of bar codes but also may be extended to other methods such as magnetic recordings or semiconductor memory recordings.

In the aforementioned preferred embodiment a plurality of functions (program) is provided, and the indicated functions are put into operations according to the kind of card. These functions can be stored on the card itself, so that they can be read out and put into practice.

The present invention is not restricted to electronic musical instruments but may also be applied to a variety of electronic apparatuses.

Second preferred embodiment

Figure 25:
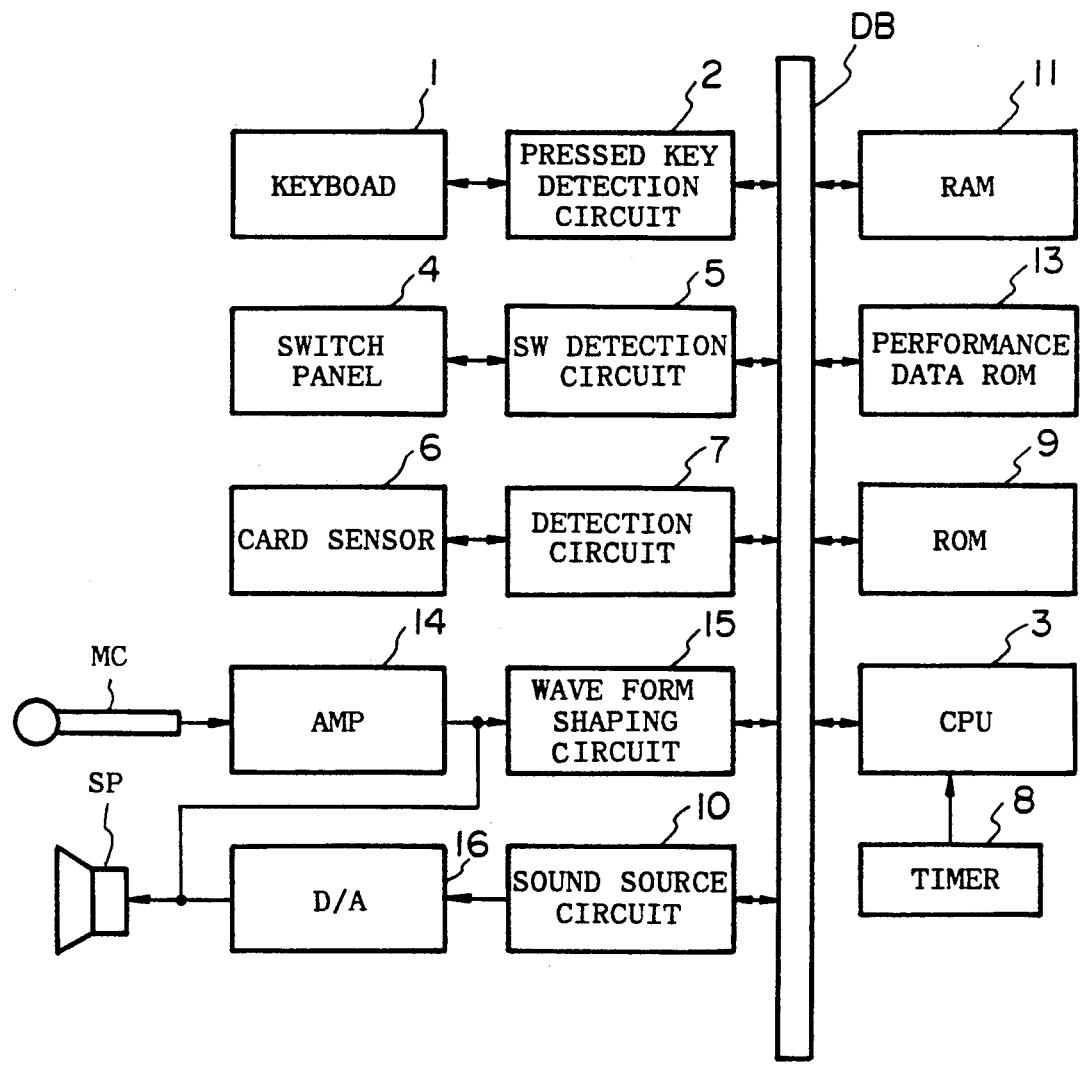
FIG. 25 is a block diagram showing the construction of an electronic musical instrument according to the second preferred embodiment of the present invention.

FIG. 25 is a block diagram showing the construction of the second preferred embodiment of the present invention. In this preferred embodiment, the electronic musical instrument, which carries out an automatic performance and which marks how the song which is sung along with aforementioned automatic performance matches the automatic performance, is explained as an example. Parts having the same function as construction elements of FIG. 1 are labeled with the same numbers and explanation is omitted. Sound source circuit 10 carries out such things as level adjustment of the aforementioned sound data and supplies aforementioned sound data to D/A-converter 16. The sound data are vocalized by speaker SP after having been converted to an analog signal by D/A-converter 16. In the performance data ROM 13, the performance data of a plurality of titles for the automatic performance are stored, and when a certain program is executed, the performance data of the title which is performed by CPU3 are read out, and tonalized by sound circuit 10, D/A-converter 16 and speaker SP. The function of marking how a performed song matches the aforementioned automatic performance, in other words, when the karaoke marking function is carried out according to a fixed program, the voice is supplied to CPU 3 via microphone MC, amplifier 14 and wave form shaping circuit 15. Amplifier 14 amplifies the voice to a certain level and supplies it to wave form shaping circuit 15 and speaker SP. Wave form shaping circuit 15 changes the voice to a continuous pulse signal having constant cycle and width.

Figure 26:
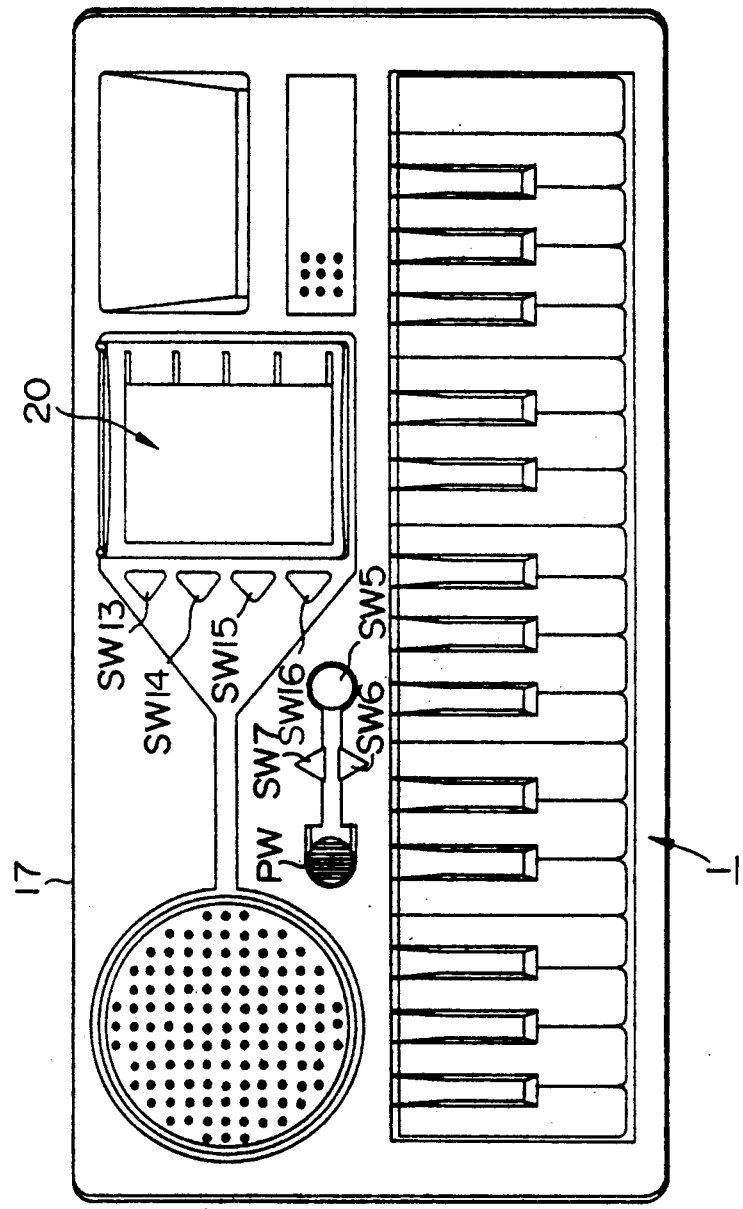
FIG. 26 shows the exterior of an electronic musical instrument according to the second preferred embodiment.

Next, an explanation is given on the positioning of each of aforementioned parts by referring to an outer view of the whole body of the musical instrument shown in FIG. 26. Identical numbers are assigned to parts according to FIG. 1 and explanation is omitted. In this figure, aforementioned card slot part 20 is provided in the center part of operation panel 17. Card slot part 20 is only for keeping the edge part of the card, and further, a window for making it possible to see the surface of the same card is provided. Selection function switches SW13, SW14, SW15 and SW16 are arranged on the side part of card slot part 20. Another power source switch PW, demo switch SW5 and volume switches SW6, SW7 are located at fixed positions.

Figure 27:
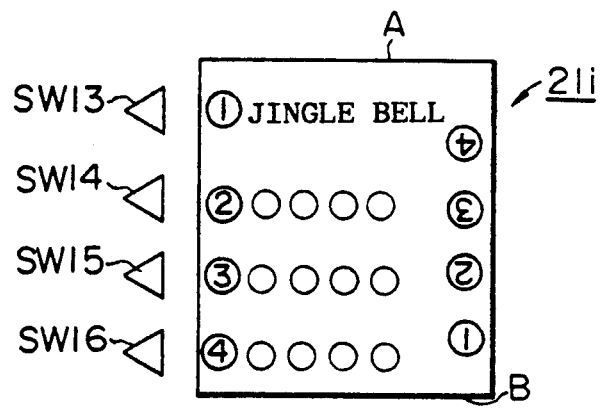
FIG. 27 is a top view of the function selection switch provided at the surrounding of card 21i of the same second preferred embodiment.
Figure 28:
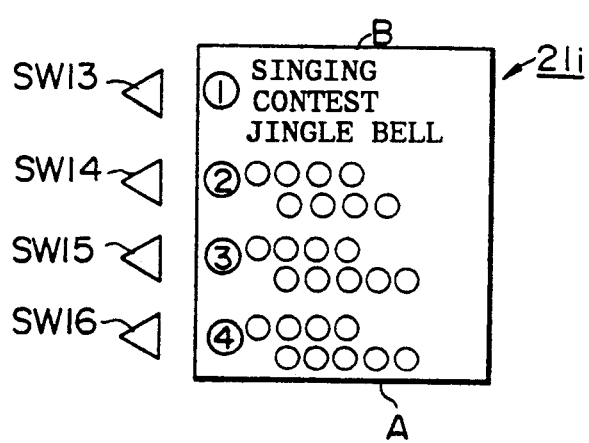
FIG. 28 is a top view of card 21i of the second preferred embodiment when fixed upside down and the function selection switches are provided in the neighbourhood of card 21i.
Figure 29:
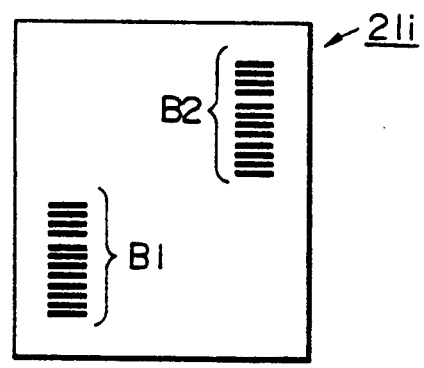
FIG. 29 is a back view showing the bar code drawn on the back side of card 21i of the same second preferred embodiment.

Next, an explanation on aforementioned card slot part 20, function selection switches SW13 to SW16 provided in the vicinity thereof and the card is given by referring to FIGS. 27 through 29. FIGS. 27 and 28 are front views showing the arrangement of card slot part 20 of operation panel 17 and the positioning of function selection switches SW13 to SW16 which are provided in the vicinity thereof.

In this figure, card 21i is inserted into card slot part 20. On the surface of this card 21i, letters showing the function assigned to the aforementioned function selection switches SW13 to SW16 when aforementioned card 21i is inserted with its end A up (see FIG. 27), and letters showing the functions assigned to aforementioned function selection switches SW13 to SW16 when inserted with the other end B up (see FIG. 28), are printed in the right position corresponding to each insertion direction. For this example, when the card was inserted with end A up, the title of the song automatically performed is printed, and on the other hand, when it is inserted with the other end B up, the function marking the conformity of the performed song with the automatic performance, the title of the so called karaoke marking function is printed. The printed letters showing these functions are printed in a fixed position so that they correspond geometrically to the function selection switches SW13 to SW16. Then, on the back side of card 21i, a bar code B1 and B2 showing the card function similar to the aforementioned first preferred embodiment are printed on a fixed position, as shown in FIG. 29, and are made up of stop bit, parity bit and card function data. These card function data consist of seven bits, take values between 1 and 127, whereby 0 is excluded, and based on this, can distinguish 127 kinds of card functions. Accordingly, if in one card 21i two kinds of functions are provided, like in this example, at most 64 cards can be provided.

Furthermore, a bar code read out apparatus similar to the first preferred embodiment is provided at a fixed position of card slot part 20.

The action of the aforementioned preferred embodiment is explained by referring to the flow charts shown in FIG. 30 through 37.

Figure 30:
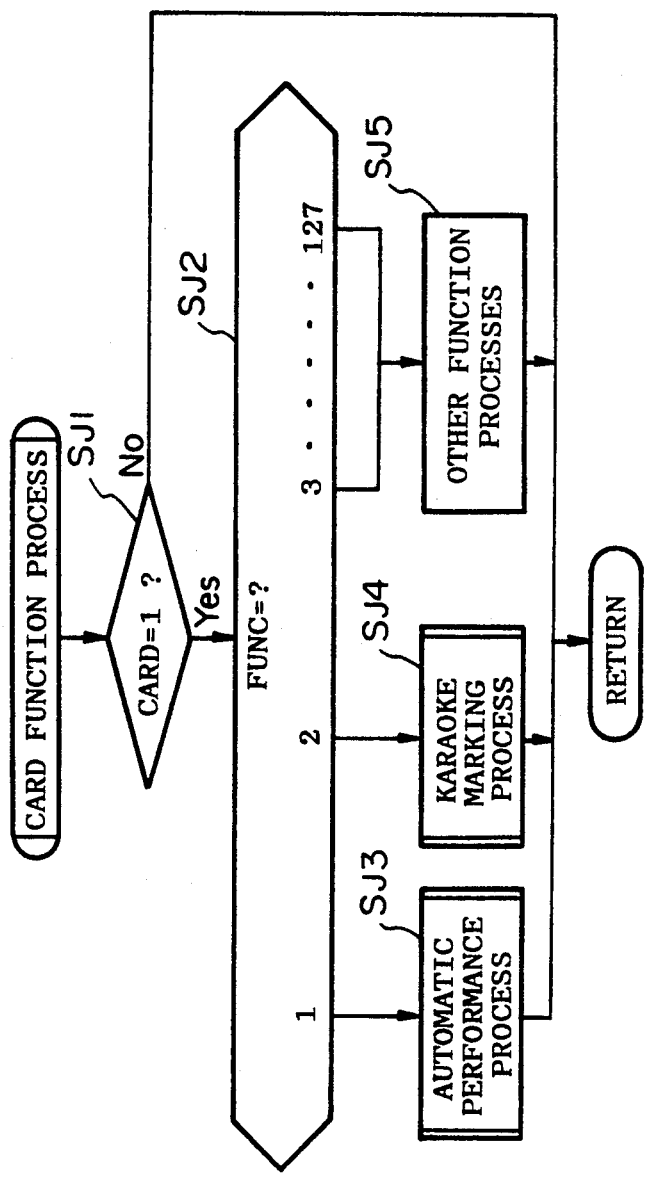
FIG. 30 is a flowchart showing the card function process of the same second preferred embodiment.

When the power source is connected, a process similar to the one of the aforementioned "voice selector" card 21a and shown in the flow-charts in FIG. 5 and FIG. 7 is carried out by CPU 3. The initialization in step SA1 is not carried out and also the press key process in step SA2 shown in FIG. 6 is not carried out. The card scan process in step SA4, which is shown in FIG. 7, is carried out. If in the main preferred embodiment the bar code read out is carried out correctly, step SC4 follows next and the read out data, in other words, the card function number is temporarily stored in register FUNC. If for example, as shown in FIG. 27, card 21i is inserted with end A up, register FUNC is set to 1, and if the card is inserted with the other end B up, as indicated in FIG. 28, it is set to 2. Next, register FUNC step SA5 the card function process shown in FIG. 30 is carried out.

In this card function process, first it is decided in step SJ1 whether or not register CARD is 1. When no card 21i is inserted, and therefore register card is 0, the decision result in step SJ1 becomes No, the aforementioned routine is terminated and there is a jump back to the main routine.

Figure 31:
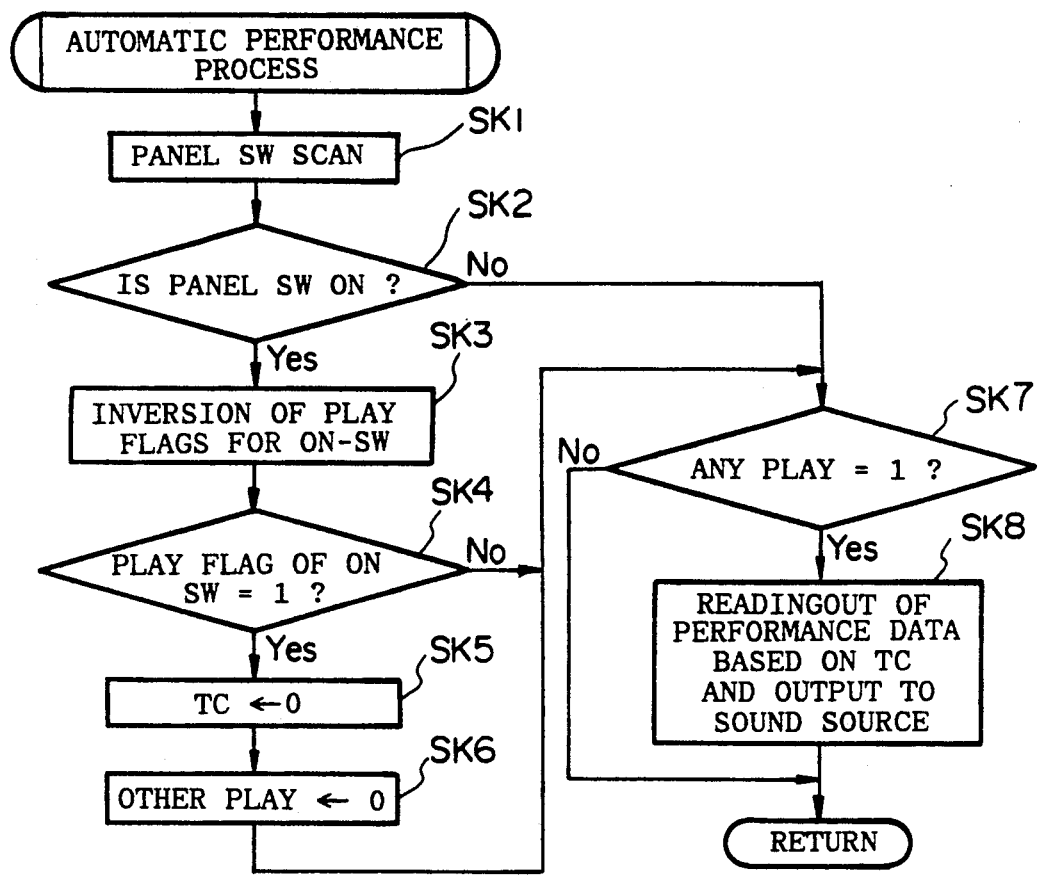
FIG. 31 is a flowchart showing the automatic performance process of the main preferred embodiment.
Figure 32:
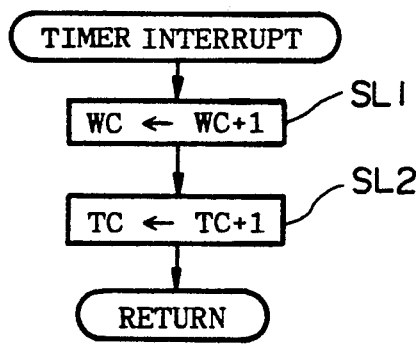
FIG. 32 is a flowchart showing the time interrupt routine of the main preferred embodiment.

If on the other hand card 21i is inserted, the decision result in step SJ1 becomes Yes, and step SJ2 follows next. In step SJ2, register FUNC is referred to and it is decided what card with which function has been inserted. When for example card 21i with end A up is inserted, register FUNC is set to 1 and step SJ3 follows next. In step SJ3, the automatic performance process indicated in FIG. 31 is carried out.

In the automatic performance process, first the function selection switches SW1 to SW4 are scanned in step SK1. Then, in step SK2 it is decided which of of the function selection switches SW1 to SW4 was pressed down.

If none of the function selection switches SW1 to SW4 is pressed down, the decision result of step SK2 is No and step SK7 follows next. In step SK7 it is decided whether or not one of the play flags PLAY 1 to PLAY 4 is 1. These play flags PLAY 1 to PLAY 4 can be 0 or 1 respectively, whereas 1 indicates that the title assigned to aforementioned function selection switches SW1 to SW4 is performed, and 0 indicates that no performance is carried out.

If one of the play flags PLAY 1 to PLAY 4 is 1, the decision result in step SK7 is Yes and step SK8 follows next. In step SK8, based on tempoclock TC, the performance data of play flag PLAY which are set to 1 are read out from performance data ROM 13 and output to sound source circuit 10. Aforementioned tempoclock TC is incremented in a time interrupt routine, shown in FIG. 32 which performs an interrupt generated at fixed periods In the time interrupt routine, first, window counter WC is incremented in step SL1. This window counter WC is a counter used in the karaoke marking process and explained in detail hereafter. Next, in step SL2, aforementioned tempoclock TC is incremented, the operation terminated and then follows a jump back to the main routine.

In step SK8 of the automatic performance process, when the end of the performance data is detected, the corresponding play flag PLAY is set to 0.

On the other hand, if the process of step SK8 is terminated, or if each of the play flags PLAY1 to PLAY 4 are 0 and the decision result in aforementioned step SK7 is No, there is a jump back to the card function process and subsequently there is a jump back to the main routine.

On the other hand, if the decision result in step SK2 is Yes, in other words, it one of the function selection switches SW1 to SW4 has been pressed down, step SK3 follows next. In step SK3 play flags PLAY 1 to PLAY4 of the pressed switches within the function selection switches SW1 to SW4 are reversed. By this, whenever a selection function switch SW1, SW2, SW3 or SW4 is pressed down, each alternatively repeats the on and off state.

Then, step SK4 follows next and it is decided whether or not one of play flags PLAY1 to PLAY4 equal 1, which corresponds to a pressed down switch within the function selection switches SW1 to SW4. If the decision result in step SK4 is Yes, in other words, in case of a new press down, step SK5 follows next. In step SK5 tempoclock TC is set to 0 for performing the melody from the beginning. Then in step SK6, play flag PLAY of the non pressed switches are set to 0 for playing only the selected title. Then step SK7 follows next. In this case, since at least one of the play flags PLAY1 to PLAY4 are set to 1, the decision result in step SK7 becomes Yes and step SK8 follows next. In step SK8 performance is carried out from the beginning of the melody.

On the other hand, if the decision result in step SK4 is No, in other words, if the play flag PLAY of the pressed down switches within the function selection switches SW1 to SW4 are 0, since the performance stop is selected for the title corresponding to this play flag PLAY, the counter is not reset and step SK7 follows next. In step SK7 it is decided whether or not the other play flags PLAY are set to 1, and since they are 0 for this case, the decision result becomes No, there is a jump back to the card function process and then subsequently a jump to the main routine shown in FIG. 5.

In the main routine, step SA6 follows next, the other process for sound generation is carried out, thereafter there is a jump back to step SA1 and the aforementioned process is repeated.

Karaoke marking process

Figure 33:
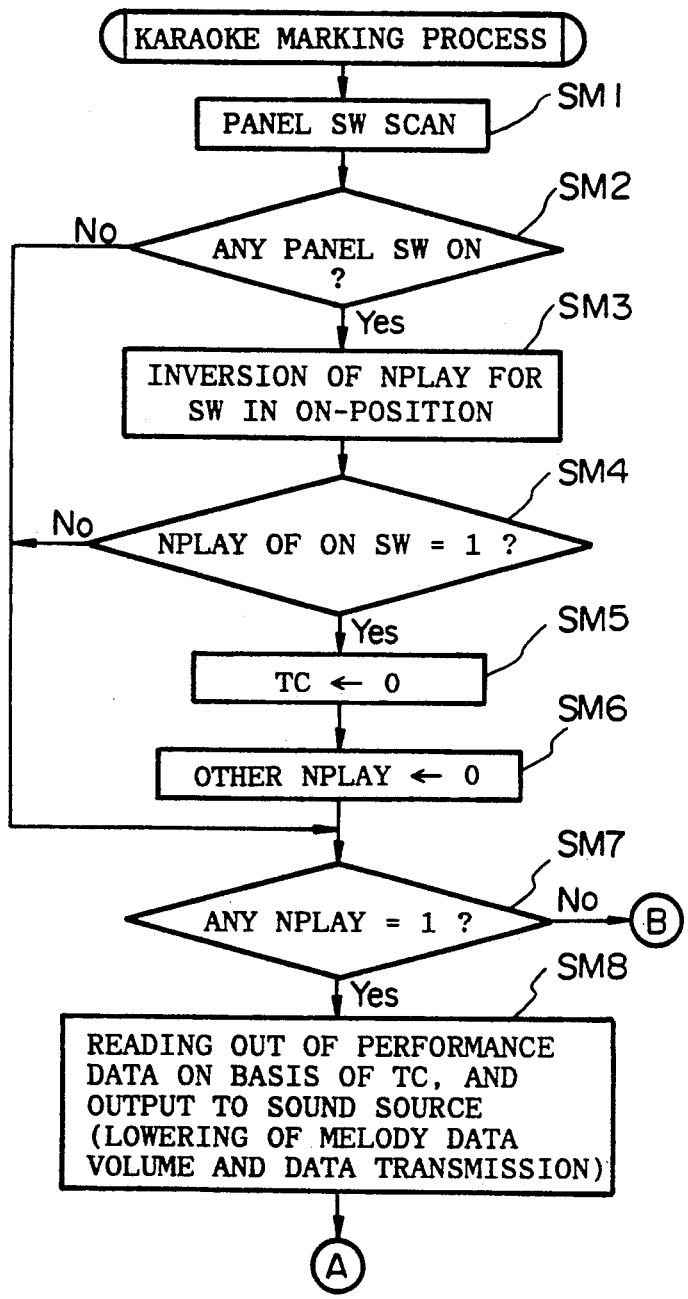
FIG. 33 is a flowchart showing the karaoke marking process of the main preferred embodiment.
Figure 34:
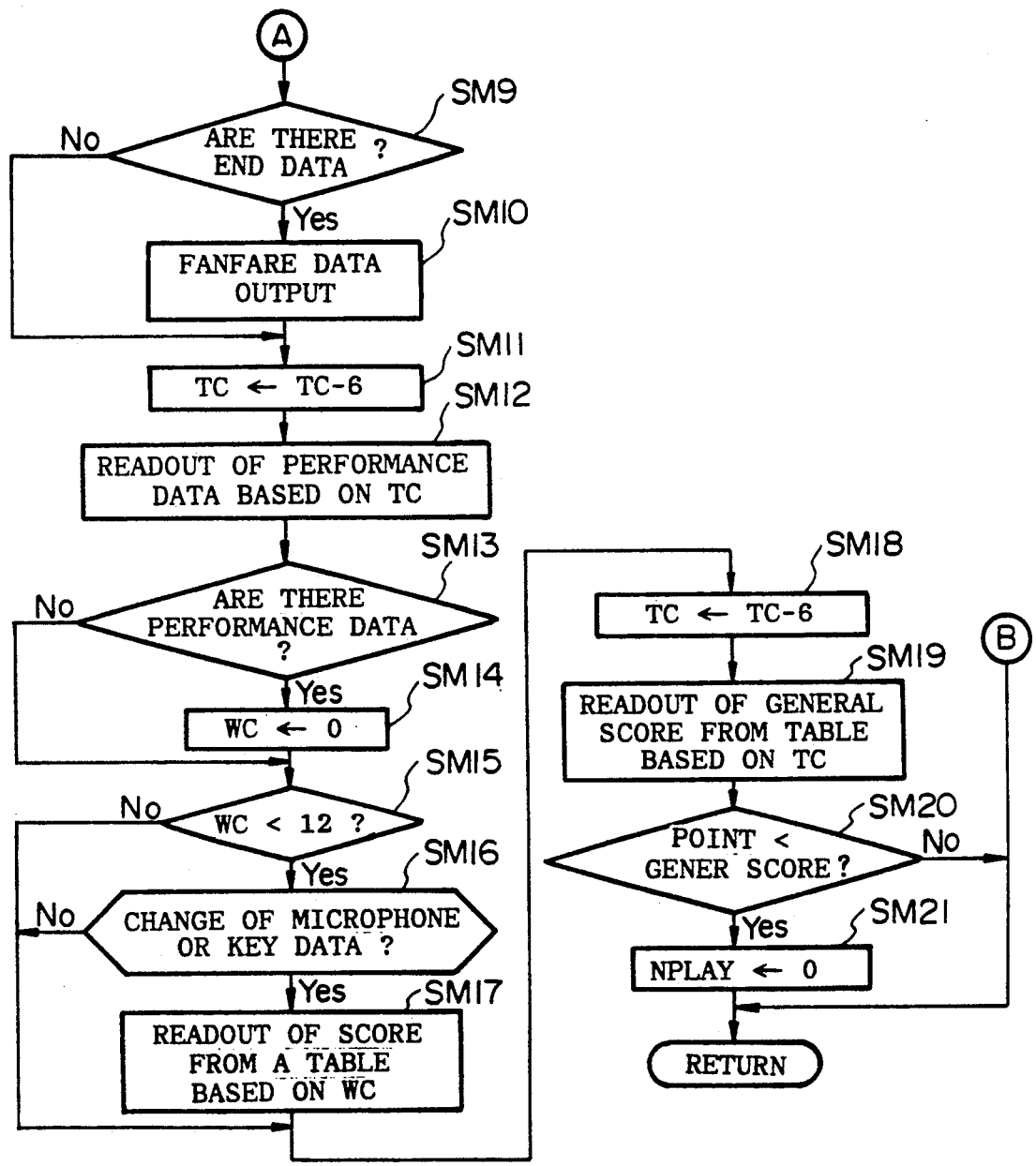
FIG. 34 is a flowchart showing the karaoke marking process of the main preferred embodiment

By referring to the flowcharts shown in FIG. 33 and FIG. 34 the action is explained for the case when aforementioned card 21i is inserted with the other end B up. Explanations concerning parts in common with the aforementioned process are omitted. In this case, like for automatic performance, the performed title is programmed to each of the function selection switches SW1 to SW4. This musical instrument generates a window of fixed period and only within the period of aforementioned window, the discrepancy between the sound timing of the automatically performed accompaniment and the voice timing of the singer as well as the discrepancy between the end sound timing and the end voice timing of the singer are detected. Based on the extent of this discrepancy the marking is carried out.

FIG. 35a shows the input wave form for microphone MC, FIG. 35b shows the output wave form of wave form shaping circuit 15 and FIG. 35c shows the musical note data in the automatic accompaniment. In these figures the voice signal of the analog signal input from microphone MC is converted to a pulse signal by wave form shaping circuit 15. CPU 3 determines the length of this pulse signal and determines whether its the voice or noise. If it is decided to be noise, no input is made.

If card 21i is inserted in the aforementioned direction, in step SC4 of the card scanning process shown in FIG. 7, register FUNC is loaded with 2. In step SC5, function selection switches SW1 to SW4 are set to the value corresponding to the card function based on register FUNC. Then, in step SJ2 of the card function process shown in FIG. 30, register FUNC is set to 2, step SJ4 follows next and the karaoke marking process indicated in FIG. 33 is carried out.

In the karaoke marking process shown in FIG. 33, function selection switches SW1 to SW4 are scanned in step SM1. Then in step SM2 the scan result, that is, whether or not one of the function selection switches SW1 to SW4 is pressed down is decided. If one of the function selection switches SW1 to SW4 was pressed down, the decision result in step SM2 is Yes and step SM3 follows next. In step SM3 the play flags NPLAY 1 to NPLAY4 of the pressed down switches within function selection switches SW1 to SW4 are inverted. By doing this, whenever pressing a function selection switch of SW1 to SW4 the on and off state is alternatively repeated. In other words, a switch being in on-position is switched off and conversely, a switch in off-position is switched on.

Then, step SM4 follows next and it is decided whether or not play flags NPLAY 1 to NPLAY 4 corresponding to the pressed down switches within function selection switches SW1 to SW4 are equal to 1. Then, if the decision result in step SM4 is Yes, that is, if there was a new press down, step SM5 follows next. In step SM5 tempoclock TC is set to 0 for performing the melody from the beginning. Then, in step SM6 play flag NPLAY is set to 0 for the not pressed down switches in order to perform only the titles selected.

If the process in step SM6 is terminated, or if function selection switches SW1 to SW4 are not pressed down and the decision result in step SM2 is No, and further if any of the function selection switches SW1 to SW4 is pressed down to have an off state and the decision result in step SM4 is No, step SM7 follows next.

In step SM7 it is decided whether or not one of the play flags NPLAY 1 to NPLAY 4 is 1. If the decision result in this step SM7 is No, the aforementioned process is terminated and there is a jump back to the card function process and consequently a jump back to main routine. In the main routine step SA6 follows next, the other process for sound creation is carried out and thereafter, there is a jump back to SA1 and the aforementioned process is repeatedly carried out.

On the other hand, if the decision result in step SM7, in other words, if one of the function selection switches SW1 to SW4 is pressed down or if a new one is pressed down, step SM8 follows next. In step SM8, the performance data of play flag PLAY which are set to 1 is read out from performance data ROM13 and put out to sound source circuit 10 on the basis of tempoclock TC. The performance data at this time (musical note data) are depicted in FIG. 35c. The sound timing of the musical note data are indicated by the sign KON and the end sound timing by the sign KOFF. At this time, both, melody data and accompaniment data are read out, however, data decreasing only the volume of the melody data are output. Then step SM9 follows next and it is decided whether or not the performance data are read out as end data (indicating the termination of the performance). When end data are read out, the decision result in step SM9 is Yes and step SM10 follows next. In step SM10 the fanfare date indicating the termination of the performance are outputted to sound source circuit 10. As a result of this, the fanfare is vocalized by the speaker SP. In case of this preferred embodiment, if the discrepancy between the sound timing of the automatically performed accompaniment and the voice timing of the singer is big and the marking result does not fall within a fixed range, the accompaniment is not performed until the end.

On the other hand, when the end data are not read out and the performance data are interrupted, the decision result in step SM9 is No, and step SM11 follows next. In step SM11, six is added to timingclock TC. Then, step SM12 follows next and based on timingclock TC performance data are read out from performance data 13. In step SM 13, it is decided whether or not performance data are present. If the decision result in step SM13 is Yes, step SM14 follows next. In step SM14 window counter WC is cleared to 0.

When the process in step SM14 is terminated, and also the decision result in step SM13 is No, step SM15 follows next. In step SM15 it is decided whether or not window counter WC is less than 12. An explanation is given on the window counter WC by referring to the wave form charts indicated in FIG. 36a and FIG. 36b. In these figures, FIG. 36a shows the pulse wave function outputted by wave form shaping circuit 15 and is equal to the wave form shown in FIG. 35b. Furthermore, FIG. 36b shows the sound note data which are equal to the wave form shown in FIG. 35c. This window counter WC, as shown in FIG. 36, is a counter for determining the width of the window between the sound timing of the sound notes and the end sound timing, and the width of the window which is provided before and after each timing is a sixteenth of a note. For example, if a quarter note has 24 cycles, a sixteenth note has 6 cycles, so that the window consists of 12 cycles. Then, if window counter WC is less than 12, the decision result in step SM15 is Yes and step SM16 follows next.

In step SM16 it is decided whether or not the microphone input or key data have changed. If the decision result in step SM16 is Yes, step SM17 follows next. In step SM17, score P is read out from a fixed table based on window counter WC, and after having added score P to the content of register POINT, it is restored to register POINT. In other words, when window counter WC is below 12, the score according to the counter value is added. For example, as shown in FIG. 36b section 1, if the voice timing which was input has a big shift, there is no score. If there is a short sound time shift, as indicated in section 2, a low score is obtained. Finally, if the voice timing is more or less exact as in region 3, a high score is given. Then, if step SM17 is terminated, step SM18 follows next.

On the other hand, if window clock WC is bigger than 12 and the decision result in step SM15 is No, or window clock WC is less than 12, and if microphone input and key data do not change and so the decision result in step SM16 became No, no score is added and step SM 18 follows next.

In step SM 18, six is subtracted from tempoclock TC. Then in step SM19, based on tempoclock TC, the general score is read out from the table. This general score is a threshold score in this moment and provided to the tempoclock TC in a fixed interval. Next, in step SM20 the score up to this moment stored in register POINT (score during the melody) is compared with the aforementioned general score and it is decided whether or not the score at this moment is less than the general score. If the decision result in step SM20 is Yes, step SM21 follows next. In step SM21, play flag NPLAY is cleared to 0 so that the threshold scale does not match the score at this moment and the performance is terminated. Then, aforementioned marking process is terminated, there is a jump back to the card function process and consequently a jump back to the main routine. In the main routine, step SA6 follows next, the other process is performed and thereafter there is a jump back to SA1 and the aforementioned process is repeatedly carried out.

On the other hand, if the score until there is bigger than the general score, the decision result in step SM20 is No, the performance is not terminated, and once the aforementioned karaoke marking process is terminated, there is a jump back to the card function process and consequently a jump back to the main routine. Accordingly, in this case, the karaoke process is continuously carried out until the performance is terminated. When the performance does not stop on its way and goes until to the end, as mentioned before, the decision result in step SM9 is Yes, and step SM10 follows next where the fanfare data are outputted to sound source circuit 10. Then, the fanfare is played by the speaker SP. Thereafter, step SM11 to SM21 are carried out similarly as mentioned before.

Not as in conventional musical instruments carrying out karaoke markings whereby over the whole period of performance comparison was carried out, according to the aforementioned results, windows of a fixed interval are generated and only during the period of the aforementioned window the discrepancy between the sound timing of the automatically performed accompaniment and the voice timing of the singer as well as the discrepancy between the sound end timing and the voice end timing of the singer is detected, and since the marking is done according to the degree of these differences, there is the advantage that the processing time necessary for comparison can be shortened.

The karaoke marking process in the aforementioned preferred embodiment aimed at the marking of the voice, however, it also can aim at the performance of keyboard 1.

Furthermore, in the preferred embodiment only the voice timing and end timing are marked, however there is no limitation on this, pitch sampling can be done and by referring to key codes the frequency (pitch) of the input tone can also be the object of marking.

Figures 37A, 37B, 37C:
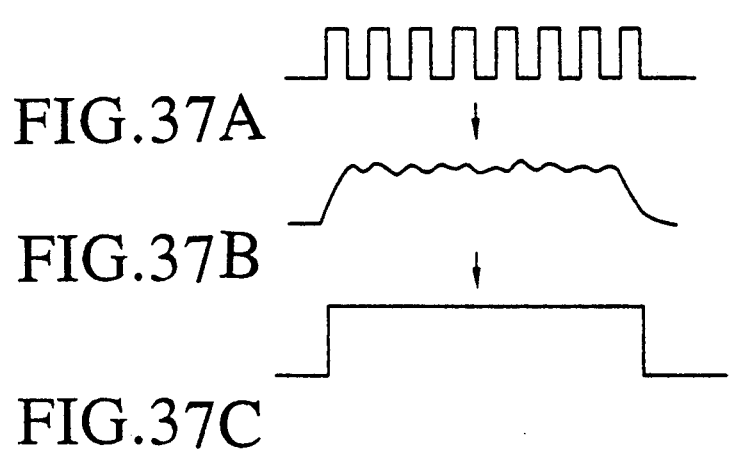
FIG. 37A is wave form diagram showing the pulse signal to which the incident wave of the microphone MC was changed.
FIG. 37B is a wave diagram integrating and forming the aforementioned pulse signal.
FIG. 37C is a wave diagram forming aforementioned integrated wave-form by a logic IC to performance data and a corresponding format.

The signal of the microphone input can be compared after the pulse signal indicated in FIG. 37a has been formed to a wave shape indicated in FIG. 37b and after having been changed to a format equal to the performance data, as shown in FIG. 37c, by the logic IC. When proceeding like this, the comparison of the sound note data becomes easy.

Furthermore, the function of card 21i can also be changed by varying the insertion direction besides of up and down like in the preferred embodiment to front and back and standing sideways.

What is claimed is:

1. An electronic musical instrument which carries out a plurality of process functions, comprising:
   a plurality of operation elements to be operated;
   function designation means for storing function designation data which designates a plurality of functions corresponding to one of a plurality of process functions;
   setting means for freely connecting or disconnecting the function designation means with the electronic musical instrument, the setting means including a detecting means for detecting which of the plurality of process functions is to be carried out;

reading means for reading out the function designation data stored in the function designation means;

assigning means for respectively assigning the plurality of functions, designated based on the function designation data, to plurality of operation elements; and control means for carrying out the functions respectively assigned to the plurality of operation elements when the plurality of operation elements are respectively operated, wherein the electronic musical instrument carries out a plurality of process functions by changing the function designation means to be connected therewith.

2. An electronic musical instrument according to claim 1, wherein said function designation means and said setting means are formed so that said function designation means can be connected with said setting means in at least two directions.

3. An electronic musical instrument according to claim 1, wherein said setting means is provided in the vicinity of said plurality of operation elements, and each function of said plurality of operation elements are indicated on said function designation means so that a distinction of functions assigned to each of said plurality of operation elements is simplified.

4. An electronic musical instrument according to claim 3, wherein colors of parts of the function designation means respectively close to the plurality of operation elements are respectively equal to colors of the functions of the plurality of operation elements indicated on the function designation means.

5. An electronic musical instrument according to claim 1 comprising display means for displaying a process function designated by said function designation means.

6. An electronic musical instrument according to claim 5, wherein an indication representing a content of the process function is indicated on a part of the function designation means close to the display means.

7. A music training apparatus comprising:

detachable memory means for storing a plurality of groups each of which including automatic performance data for automatic performance and specific data corresponding to said automatic performance data;

extraction means for extracting one of the plurality of groups stored in said detachable memory means;

playing means for playing the automatic performance based on the automatic performance data extracted by said extraction means;

a plurality of operation elements each of which outputs operation element data in accordance with a selection operation;

display means for displaying a plurality of visual data corresponding to said plurality of operation elements; and decision means for comparing specific data extracted by said extraction means with operation element data indicated by said operation elements, and for deciding whether or not there is coincidence thereinbetween.

8. An electronic musical instrument comprising:

detachable memory means for storing automatic performance data;

reading means for successively reading out said automatic performance data according to a predetermined timing;

timing generation means for generating one or both of sound and silence timings of externally provided performance data inputted from an external performance source according to sound or silence timing of said read out automatic performance data;

window generating means for setting the window of a predetermined time interval before or after both or one of sound and silence timing of said automatic performance data;

comparing means for comparing the degree of discrepancy between one or both of sound and silence timing of said automatic performance data and one or both of sound and silence timing of said externally provided performance data within said window; and marking means for marking according to the comparison result of said comparison means.

9. An electronic apparatus which carries out a plurality of functions, comprising:

electronic apparatus body;

function designation means having a detachable external memory for memorizing a plurality of designation data, which respectively designates predetermined functions, on predetermined locations of the function designation means;

setting means for freely connecting and disconnecting the function designation means with the electronic apparatus body;

reading means, when the function designation means is connected with the electronic apparatus body in a setting-direction, for reading out one of the plurality of designation data memorized in the function designation means, the reading means capable of reading different data in accordance with the setting-direction of the function designation means, and the read out designation data corresponding to the setting-direction of the function designation means; and control means for controlling the electronic apparatus body based on the read out designation data so that the electronic apparatus body carries out a predetermined function corresponding to the read out designation data, wherein the electronic apparatus carries out a plurality of functions in accordance with the setting-direction of the designation means to be connected therewith.

10. The electronic apparatus of claim 9 further comprising a plurality of data providing means having at least two setting-directions, wherein at least one of the data providing means is read in by the reading means in accordance with the setting-direction.

* * * * *